US012782160B2

(12) United States Patent
Fei et al.

(10) Patent No.: US 12,782,160 B2
(45) Date of Patent: Nov. 3, 2026

(54) MAP DATA PROCESSING METHOD AND APPARATUS

(71) Applicant: Yinwang Intelligent Technologies Co., Ltd., Shenzhen (CN)

(72) Inventors: Wenkai Fei, Beijing (CN); Jianqin Liu, Beijing (CN); Yong Wu, Beijing (CN)

(73) Assignee: Yinwang Intelligent Technologies Co., Ltd., Shenzhen (CN)

(*) Notice: Subject to any disclaimer, the term of this patent is extended or adjusted under 35 U.S.C. 154(b) by 107 days.

(21) Appl. No.: 18/423,331

(22) Filed: Jan. 26, 2024

(65) Prior Publication Data

US 2024/0159563 A1 May 16, 2024

Related U.S. Application Data

(63) Continuation of application No. PCT/CN2022/104197, filed on Jul. 6, 2022.

(30) Foreign Application Priority Data

Jul. 30, 2021 (CN) ......................... 202110876093.4

(51) Int. Cl.
*G01C 21/00* (2006.01)

(52) U.S. Cl.
CPC ....... *G01C 21/387* (2020.08); *G01C 21/3859* (2020.08)

(58) Field of Classification Search
CPC .............. G01C 21/387; G01C 21/3859; G01C 21/3811; G01C 21/3881; G08G 1/0112; G08G 1/0141; G08G 1/0116; G08G 1/0129; G08G 1/0133; G06F 16/29; G06F 16/9537
See application file for complete search history.

(56) References Cited

U.S. PATENT DOCUMENTS

| | | | | |
|---|---|---|---|---|
| 11,932,242 | B1 * | 3/2024 | Crego | B60W 30/09 |
| 2008/0088486 | A1 | 4/2008 | Rozum et al. | |
| 2011/0161261 | A1 | 6/2011 | Wu et al. | |
| 2014/0372035 | A1 * | 12/2014 | Masuda | G01C 21/3415 701/537 |
| 2018/0276108 | A1 * | 9/2018 | Park | G06Q 10/06 |
| 2019/0089634 | A1 | 3/2019 | Jin et al. | |
| 2020/0175853 | A1 | 6/2020 | Xu et al. | |
| 2021/0108942 | A1 * | 4/2021 | Stenneth | G01C 21/3691 |
| 2022/0319336 | A1 * | 10/2022 | Averbuch | G08G 1/0141 |

(Continued)

FOREIGN PATENT DOCUMENTS

| | | | |
|---|---|---|---|
| CN | 104025573 | A | 9/2014 |
| CN | 106971547 | A | 7/2017 |

(Continued)

*Primary Examiner* — Rami Khatib

(74) *Attorney, Agent, or Firm* — Leydig, Voit & Mayer, Ltd.

(57) ABSTRACT

In a method of generating an event map, a processing device obtains first information that indicates that there is an association relationship between a first event and a second event. The first information comprises association type information that indicates a type of the association relationship, and the first and second events are events in a map. The processing device then stores the first information as data of the map.

19 Claims, 9 Drawing Sheets

(56) References Cited

U.S. PATENT DOCUMENTS

| | | | | |
|---|---|---|---|---|
| 2023/0349715 | A1* | 11/2023 | Fei | G06F 18/23213 |
| 2024/0167840 | A1* | 5/2024 | Fei | G08G 1/0141 |

FOREIGN PATENT DOCUMENTS

| | | | |
|---|---|---|---|
| CN | 107003430 | A | 8/2017 |
| CN | 108072383 | A | 5/2018 |
| CN | 109410565 | A | 3/2019 |
| CN | 109584553 | A | 4/2019 |
| CN | 112102640 | A | 12/2020 |

* cited by examiner

Row

| | Event 1 | Event 2 | ... | Event n |
|---|---|---|---|---|
| Event 1 | $W_{11}$ | $W_{12}$ | ... | $W_{1n}$ |
| Event 2 | $W_{21}$ | $W_{22}$ | ... | $W_{2n}$ |
| ... | ... | ... | ... | ... |
| Event n | $W_{n1}$ | $W_{n2}$ | ... | $W_{nn}$ |

MAP DATA PROCESSING METHOD AND APPARATUS

CROSS-REFERENCE TO RELATED APPLICATIONS

This application is a continuation of International Application PCT/CN2022/104197, filed on Jul. 6, 2022, which claims priority to Chinese Patent Application No. 202110876093.4, filed on Jul. 30, 2021. The disclosures of the aforementioned priority applications are hereby incorporated by reference in their entirety.

TECHNICAL FIELD

This application relates to the field of intelligent driving and the field of maps, and in particular, to a map data processing method and apparatus.

BACKGROUND

A map can assist a vehicle in performing autonomous driving. The map includes static information and dynamic information. The static information describes a map element whose status does not change with time, for example, road network structure data (such as a lane or a road), and road traffic facility data (such as a traffic sign or a roadside facility). The dynamic information describes events that change with time, for example, a traffic accident event, a traffic congestion event, and a road icing event, and the events are associated. For example, the traffic accident event aggravates a congestion degree of the traffic congestion event. For another example, congestion of a road A may cause congestion of a road B connected to the road A.

Future intelligent driving and intelligent transportation pose higher requirements on richness of map information. However, richness of existing map content cannot fully meet requirements of future use.

SUMMARY

This application discloses a map data processing method and apparatus, to quickly index an event associated with a changed event in a map, implement linkage update of the event, and improve map update efficiency and reliability of driving decision-making.

According to a first aspect, this application provides a map generation method. The method includes: generating first information, where the first information indicates that there is an association relationship between at least two events, the at least two events include a first event and a second event, the first information includes association type information, the association type information indicates a type of the association relationship, and the at least two events are events in a map; and storing the first information as data of the map.

In the foregoing method, map information including an association relationship between events in the map is generated, and is used as prior information. The map information can meet more abundant use requirements. For example, a change of another event caused by a change of an event may be predicted based on an association relationship between events in the map, and a prediction result may be further used as a corroboration reference of the change of the another event. This helps quickly and accurately complete update of a large quantity of events in the map, and improves map update efficiency and reliability of driving decision-making.

Optionally, after storing the first information, the method further includes: sending the first information to a map using apparatus. It should be noted that the first information may be sent through a hardware interface in a hardware device or a data interface in a software module. The map using apparatus includes but is not limited to a cloud device, a roadside device, a terminal device, or a component, a chip, a software module, a hardware module, or an interface in these devices.

Optionally, the type of the association relationship includes that the first event is a cause event of the second event, or the first event is a result event of the second event.

In the foregoing implementation, the first event and the second event are causally related. If the first event is a cause event of the second event, it indicates that the second event is affected by the first event. If the first event is a result event of the second event, that is, the second event is a cause event of the first event, it indicates that the first event is affected by the second event.

Optionally, the first information further includes an association factor, and the association factor indicates a degree of correlation between the first event and the second event.

The association factor may be represented by a floating point number of (0, 1]. A larger value of the association factor indicates a stronger degree of correlation between the first event and the second event. The association factor is a comprehensive index, and may represent the degree of correlation between the first event and the second event overall (including a dimension such as time, space, or attribute).

Optionally, the first information further includes a time correlation factor, and the time correlation factor indicates a degree of time correlation between the first event and the second event.

The time correlation factor may be represented by a floating point number of (0, 1]. A larger value of the time correlation factor indicates a stronger degree of time correlation between the first event and the second event.

The degree of time correlation between the first event and the second event may be represented as overlapping duration between a time range of the first event and a time range of the second event, or may be represented as an intersection over union or a time interval between the two time ranges. Therefore, optionally, the first information further includes at least one of the following: information indicating overlapping duration between a first time range of the first event and a second time range of the second event; information indicating a first intersection over union between the first time range and the second time range; and information indicating a time interval between the first time range and the second time range. The first intersection over union is a ratio of the overlapping duration to duration of a third time range, and the third time range is a union set of the first time range and the second time range.

In the foregoing implementation, the overlapping duration, the first intersection over union, and the time interval may all be used to measure the degree of time correlation between the first event and the second event. For example, the time correlation factor may be obtained by performing weighted summation on the overlapping duration, the first intersection over union, and the time interval. When other parameters remain unchanged, larger overlapping duration indicates a larger time correlation factor; when other parameters remain unchanged, a larger first intersection over union indicates a larger time correlation factor; and when other parameters remain unchanged, a smaller time interval indicates a larger time correlation factor. It may be understood that, for details about whether a parameter is positively correlated or negatively correlated with the time correlation factor, refer to a physical meaning of the parameter.

Optionally, the first information further includes a spatial correlation factor, and the spatial correlation factor indicates a degree of spatial correlation between the first event and the second event.

The spatial correlation factor may be represented by a floating point number of (0, 1]. A larger value of the spatial correlation factor indicates a stronger degree of spatial correlation between the first event and the second event.

The degree of spatial correlation between the first event and the second event may be represented as an overlapping area, an interval distance, or an intersection over union between location data covered by the first event and location data covered by the second event, or may be represented as a degree of traffic reachability between the two pieces of location data. Therefore, optionally, the first information further includes at least one of the following: information indicating an overlapping area between first location data of the first event and second location data of the second event; information indicating a second intersection over union between the first location data and the second location data; information indicating an interval distance between the first location data and the second location data; and information indicating a degree of traffic reachability between the first location data and the second location data. The second intersection over union is a ratio of the overlapping area to an area of third location data, and the third location data is a union set of the first location data and the second location data.

In the foregoing implementation, the overlapping area, the second intersection over union, the interval distance, and the degree of traffic reachability may all be used to measure the degree of spatial correlation between the first event and the second event. For example, the spatial correlation factor may be obtained by performing weighted summation on the overlapping area, the second intersection over union, the interval distance, and the degree of traffic reachability. When other parameters remain unchanged, a larger overlapping area indicates a larger spatial correlation factor; when other parameters remain unchanged, a larger second intersection over union indicates a larger spatial correlation factor; when other parameters remain unchanged, a smaller interval distance indicates a larger spatial correlation factor; and when other parameters remain unchanged, a larger degree of traffic reachability indicates a larger spatial correlation factor. It may be understood that, for details about whether a parameter is positively correlated or negatively correlated with the spatial correlation factor, refer to a physical meaning of the parameter.

Optionally, the first information further includes a spatiotemporal correlation factor, and the spatiotemporal correlation factor indicates a degree of time and space correlation between the first event and the second event.

The spatiotemporal correlation factor may be represented by a floating point number of (0, 1]. A larger value of the spatiotemporal correlation factor indicates a stronger degree of time and space comprehensive correlation between the first event and the second event.

Optionally, the first information further includes an attribute correlation factor, and the attribute correlation factor indicates a degree of attribute correlation between the first event and the second event.

The attribute correlation factor may be represented by a floating point number of (0, 1]. A larger value of the attribute correlation factor indicates a stronger degree of attribute correlation between the first event and the second event.

Optionally, the first information further includes at least one of the following: information indicating an identifier of the first event; information indicating an identifier of the second event; information indicating an identifier of a map tile in which the first event is located; and information indicating an identifier of a map tile in which the second event is located.

In the foregoing implementation, indexing based on an identifier of an event can improve event query efficiency.

Optionally, the first information is stored in a data structure that is in the map and that is used to describe the first event or the second event.

Optionally, the first information is stored in a data structure that uses the identifier of the first event and the identifier of the second event as a joint index.

Optionally, the method further includes: obtaining second information, where the second information indicates a current status of the first event; determining, based on the second information, that the first event changes; determining, based on the first information, that the first event meets a preset condition; and updating description information of the second event in the map based on the second information.

In the foregoing implementation, when it is detected that an event changes and meets the preset condition, quick indexing of another event associated with the event can be implemented based on the first information. This improves event searching efficiency and inter-event linkage update efficiency.

Optionally, the preset condition includes at least one of the following: the first event is a cause event of the second event; the first event is a cause event of the second event, and the degree of correlation between the first event and the second event is greater than a first threshold; and there is an association relationship between the first event and the second event, and the degree of correlation between the first event and the second event is greater than a second threshold.

Optionally, the determining that the first event changes includes: determining that the first event disappears; determining that the first event is a new event; or determining that a degree of change of the first event is greater than a third threshold.

In the foregoing implementation, the preset condition is a trigger condition used to update the description information of the second event.

The condition that the first event is a cause event of the second event indicates that the second event is affected by the first event.

Compared with the former condition, the condition that the first event is a cause event of the second event, and the degree of correlation between the first event and the second event is greater than a first threshold adds a limitation on the degree of correlation between the two events. The degree of correlation between the first event and the second event may be measured by at least one of the association factor, the spatiotemporal correlation factor, the time correlation factor, the spatial correlation factor, the attribute correlation factor, and the like.

In the condition that there is an association relationship between the first event and the second event, and the degree of correlation between the first event and the second event is greater than a second threshold, that there is an association relationship between the first event and the second event means that a cause and effect relationship between the first event and the second event cannot be determined, but there is an association relationship between the first event and the second event, and the association relationship may be time correlation, spatial correlation, or spatiotemporal correlation. The association relationship may alternatively be, for example, the first event and the second event occur concurrently, or the first event and the second event disappear concurrently, or the first event aggravates or reduces a degree of the second event.

For example, that the degree of correlation between the first event and the second event is greater than a second threshold may be that at least one of the association factor, the spatiotemporal correlation factor, the time correlation factor, the spatial correlation factor, the attribute correlation factor, and the like between the first event and the second event is greater than the second threshold. Alternatively, the overlapping duration between the time range of the first event and the time range of the second event may be greater than the second threshold, or the overlapping area between the location data of the first event and the location data of the second event is greater than the second threshold. This is not specifically limited in this embodiment of this application.

The determining that a degree of change of the first event is greater than a third threshold may be: The second information includes location data and attribute data of the first event at a current moment, and a value of change of the location data of the first event at the current moment compared with location data of the first event at a historical moment and/or a value of change of the attribute data of the first event at the current moment compared with attribute data of the first event at a historical moment are/is greater than the third threshold.

Optionally, when the degree of change of the first event is greater than the third threshold, the first information is updated based on the second information and updated description information of the second event in the map. Alternatively, the first information is deleted when the first event disappears.

Optionally, the method further includes: updating the first information when the following condition is met: a quantity of changed events in a plurality of events exceeds a fourth threshold; a quantity of disappeared events in a plurality of events exceeds a fifth threshold; the degree of change of the first event exceeds a sixth threshold; or a quantity of new events exceeds a seventh threshold.

In the foregoing implementation, update of description information of an event and update of association information (that is, the first information) between events may be in a dependency sequence, or may be independent and decoupled from each other. Being in a dependency sequence means that the first information is updated after the description information of the event is updated first. Being independent and decoupled from each other means that when the plurality of events meet any one of the foregoing conditions, the update of the first information may be triggered, and the update of the first information does not need to be performed after the update of the description information of the event is completed. This can improve map update efficiency.

According to a second aspect, this application provides a map using method. The method includes: obtaining first information, where the first information indicates that there is an association relationship between at least two events, the at least two events include a first event and a second event, the first information includes association type information, the association type information indicates a type of the association relationship, and the at least two events are events in a map; and performing a sensed information fusion operation, an event prediction operation, or a map tile update operation based on the first information.

In the foregoing implementation, map information indicating association information between events is obtained. A map user can predict or verify, based on the map information, an event that needs to be referred to in driving decision-making. This helps improve accuracy of driving decision-making. The map user can further preferentially update or only update, based on the association relationship between the events, a tile including an event associated with a changed event. This improves map update efficiency.

It should be noted that, for beneficial effects of the content included in the first information in the second aspect, refer to descriptions of beneficial effects of the corresponding content in the first aspect. Details are not described herein again.

Optionally, the obtaining first information is specifically generating the first information or receiving the first information.

Optionally, the type of the association relationship includes that the first event is a cause event of the second event, or the first event is a result event of the second event.

Optionally, the first information further includes an association factor, and the association factor indicates a degree of correlation between the first event and the second event.

Optionally, the first information further includes a time correlation factor, and the time correlation factor indicates a degree of time correlation between the first event and the second event.

Optionally, the first information further includes at least one of the following: information indicating overlapping duration between a first time range of the first event and a second time range of the second event; information indicating a first intersection over union between the first time range and the second time range; and information indicating a time interval between the first time range and the second time range. The first intersection over union is a ratio of the overlapping duration to duration of a third time range, and the third time range is a union set of the first time range and the second time range.

Optionally, the first information further includes a spatial correlation factor, and the spatial correlation factor indicates a degree of spatial correlation between the first event and the second event.

Optionally, the first information further includes at least one of the following: information indicating an overlapping area between first location data of the first event and second location data of the second event; information indicating a second intersection over union between the first location data and the second location data; information indicating an interval distance between the first location data and the second location data; and information indicating a degree of traffic reachability between the first location data and the second location data. The second intersection over union is a ratio of the overlapping area to an area of third location data, and the third location data is a union set of the first location data and the second location data.

Optionally, the first information further includes a spatiotemporal correlation factor, and the spatiotemporal correlation factor indicates a degree of time and space correlation between the first event and the second event.

Optionally, the first information further includes an attribute correlation factor, and the attribute correlation factor indicates a degree of attribute correlation between the first event and the second event.

Optionally, the first information further includes at least one of the following: information indicating an identifier of the first event; information indicating an identifier of the second event; information indicating an identifier of a map tile in which the first event is located; and information indicating an identifier of a map tile in which the second event is located.

Optionally, the first information is stored in a data structure that is in the map and that is used to describe the first event or the second event.

Optionally, the first information is stored in a data structure that uses the identifier of the first event and the identifier of the second event as a joint index.

Optionally, the performing a sensed information fusion operation based on the first information is specifically determining, based on the first information, a trustworthiness degree of information sensed by a sensing device.

For example, the first event is a cause event of the second event. When it is determined that a first change occurs on the first event, it may be inferred based on the first information that a second change occurs on the second event. In this case, if the sensing device senses that a third change occurs on the second event, a trustworthiness degree of the third change may be determined based on the second change.

In the foregoing implementation, a trustworthiness degree of road condition information obtained during driving can be effectively verified with reference to the first information. This helps improve accuracy of driving decision-making.

Optionally, the performing an event prediction operation based on the first information is specifically predicting a status of the second event at a preset future moment based on the first information, a current status of the first event, and a current status of the second event.

In the foregoing implementation, a status of an event associated with any event in the map may be predicted with reference to the first information, and the first information may be used as autonomous driving assistance of the map using apparatus. This helps improve accuracy of driving decision-making.

Optionally, the performing a map tile update operation based on the first information is specifically: when it is detected that the first event changes, determining, based on the first information, that the second event changes; determining a target tile to which the second event belongs in the map; and updating the target tile.

In the foregoing implementation, when it is detected that an event changes, a map tile in which an event associated with the event is located may be quickly indexed with reference to the first information, to update the map tile. This can effectively improve map update efficiency, and helps reduce network transmission pressure.

According to a third aspect, this application provides a map generation apparatus. The apparatus includes: a generation unit, configured to generate first information, where the first information indicates that there is an association relationship between at least two events, the at least two events include a first event and a second event, the first information includes association type information, the association type information indicates a type of the association relationship, and the at least two events are events in a map; and a storage unit, configured to store the first information as data of the map.

Optionally, the type of the association relationship includes that the first event is a cause event of the second event, or the first event is a result event of the second event.

Optionally, the first information further includes an association factor, and the association factor indicates a degree of correlation between the first event and the second event.

Optionally, the first information further includes a time correlation factor, and the time correlation factor indicates a degree of time correlation between the first event and the second event.

Optionally, the first information further includes at least one of the following: information indicating overlapping duration between a first time range of the first event and a second time range of the second event; information indicating a first intersection over union between the first time range and the second time range; and information indicating a time interval between the first time range and the second time range. The first intersection over union is a ratio of the overlapping duration to duration of a third time range, and the third time range is a union set of the first time range and the second time range.

Optionally, the first information further includes a spatial correlation factor, and the spatial correlation factor indicates a degree of spatial correlation between the first event and the second event.

Optionally, the first information further includes at least one of the following: information indicating an overlapping area between first location data of the first event and second location data of the second event; information indicating a second intersection over union between the first location data and the second location data; information indicating an interval distance between the first location data and the second location data; and information indicating a degree of traffic reachability between the first location data and the second location data. The second intersection over union is a ratio of the overlapping area to an area of third location data, and the third location data is a union set of the first location data and the second location data.

Optionally, the first information further includes a spatiotemporal correlation factor, and the spatiotemporal correlation factor indicates a degree of time and space correlation between the first event and the second event.

Optionally, the first information further includes an attribute correlation factor, and the attribute correlation factor indicates a degree of attribute correlation between the first event and the second event.

Optionally, the first information further includes at least one of the following: information indicating an identifier of the first event; information indicating an identifier of the second event; information indicating an identifier of a map tile in which the first event is located; and information indicating an identifier of a map tile in which the second event is located.

Optionally, the first information is stored in a data structure that is in the map and that is used to describe the first event or the second event.

Optionally, the first information is stored in a data structure that uses the identifier of the first event and the identifier of the second event as a joint index.

Optionally, the apparatus further includes: an obtaining unit, configured to obtain second information, where the second information indicates a current status of the first event; and a processing unit, configured to: determine, based on the second information, that the first event changes; determine, based on the first information, that the first event meets a preset condition; and update description information of the second event in the map based on the second information.

Optionally, the preset condition includes at least one of the following: the first event is a cause event of the second event; the first event is a cause event of the second event, and the degree of correlation between the first event and the second event is greater than a first threshold; and there is an association relationship between the first event and the second event, and the degree of correlation between the first event and the second event is greater than a second threshold. The processing unit is specifically configured to: determine that the first event disappears; determine that the first event is a new event; or determine that a degree of change of the first event is greater than a third threshold.

Optionally, the method further includes: The processing unit is further configured to update the first information when the following condition is met: a quantity of changed events in a plurality of events exceeds a fourth threshold; a quantity of disappeared events in a plurality of events exceeds a fifth threshold; the degree of change of the first event exceeds a sixth threshold; or a quantity of new events exceeds a seventh threshold.

Optionally, when the degree of change of the first event is greater than the third threshold, the processing unit is specifically configured to: update the first information based on the second information and updated description information of the second event in the map; or delete the first information when the first event disappears.

Optionally, the second information includes location data and attribute data of the first event at a current moment, and the degree of change of the first event is: a value of change of the location data of the first event at the current moment compared with location data of the first event at a historical moment and/or a value of change of the attribute data of the first event at the current moment compared with attribute data of the first event at a historical moment.

Optionally, the first event and the second event may alternatively be time-related, including any one of the following: the first time range of the first event intersects with the second time range of the second event, the time correlation factor between the first event and the second event is greater than an eighth threshold; or the spatiotemporal correlation factor between the first event and the second event is greater than a ninth threshold.

Optionally, the first event and the second event may alternatively be space-related, including any one of the following: the spatiotemporal correlation factor between the first event and the second event is greater than a ninth threshold; the spatial correlation factor between the first event and the second event is greater than a tenth threshold; the first location data of the first event overlaps with the second location data of the second event; or the interval distance between the first location data and the second location data is less than an eleventh threshold.

According to a fourth aspect, this application provides a map using apparatus. The apparatus includes: an obtaining unit, configured to obtain first information, where the first information indicates that there is an association relationship between at least two events, the at least two events include a first event and a second event, the first information includes association type information, the association type information indicates a type of the association relationship, and the at least two events are events in a map; and a processing unit, configured to perform a sensed information fusion operation, an event prediction operation, or a map tile update operation based on the first information.

Optionally, the obtaining unit is specifically configured to generate the first information or receive the first information.

Optionally, the type of the association relationship includes that the first event is a cause event of the second event, or the first event is a result event of the second event.

Optionally, the first information further includes an association factor, and the association factor indicates a degree of correlation between the first event and the second event.

Optionally, the first information further includes a time correlation factor, and the time correlation factor indicates a degree of time correlation between the first event and the second event.

Optionally, the first information further includes at least one of the following: information indicating overlapping duration between a first time range of the first event and a second time range of the second event; information indicating a first intersection over union between the first time range and the second time range; and information indicating a time interval between the first time range and the second time range. The first intersection over union is a ratio of the overlapping duration to duration of a third time range, and the third time range is a union set of the first time range and the second time range.

Optionally, the first information further includes a spatial correlation factor, and the spatial correlation factor indicates a degree of spatial correlation between the first event and the second event.

Optionally, the first information further includes at least one of the following: information indicating an overlapping area between first location data of the first event and second location data of the second event; information indicating a second intersection over union between the first location data and the second location data; information indicating an interval distance between the first location data and the second location data; and information indicating a degree of traffic reachability between the first location data and the second location data. The second intersection over union is a ratio of the overlapping area to an area of third location data, and the third location data is a union set of the first location data and the second location data.

Optionally, the first information further includes a spatiotemporal correlation factor, and the spatiotemporal correlation factor indicates a degree of time and space correlation between the first event and the second event.

Optionally, the first information further includes an attribute correlation factor, and the attribute correlation factor indicates a degree of attribute correlation between the first event and the second event.

Optionally, the first information further includes at least one of the following: information indicating an identifier of the first event; information indicating an identifier of the second event; information indicating an identifier of a map tile in which the first event is located; and information indicating an identifier of a map tile in which the second event is located.

Optionally, the first information is stored in a data structure that is in the map and that is used to describe the first event or the second event.

Optionally, the first information is stored in a data structure that uses the identifier of the first event and the identifier of the second event as a joint index.

Optionally, the processing unit is specifically configured to determine, based on the first information, a trustworthiness degree of information sensed by a sensing device.

Optionally, the processing unit is specifically configured to predict a status of the second event at a preset future moment based on the first information, a current status of the first event, and a current status of the second event.

Optionally, the processing unit is specifically configured to: when it is detected that the first event changes, determine, based on the first information, that the second event changes;

determine a target tile to which the second event belongs in the map; and update the target tile.

According to a fifth aspect, this application provides a map generation apparatus. The apparatus includes a processor and a memory. The memory is configured to store program instructions, and the processor invokes the program instructions in the memory, to perform the method according to any one of the first aspect or the possible implementations of the first aspect. Generally, a map is generated by a server, and the map generation apparatus may be a map server, or may be a component or chip in a map server. In addition, the map may alternatively be generated by a roadside device, a vehicle, or a mobile terminal, and the map generation apparatus may alternatively be the roadside device, the vehicle, or the mobile terminal, or a component or chip in the roadside device, the vehicle, or the mobile terminal.

According to a sixth aspect, this application provides a map using apparatus. The apparatus includes a processor and a memory. The memory is configured to store program instructions, and the processor invokes the program instructions in the memory, to perform the method according to any one of the second aspect or the possible implementations of the second aspect. The map using apparatus may be a vehicle, or may be a component (for example, a navigation apparatus or an autonomous driving apparatus in a vehicle) that can be used in a vehicle, or may be a chip that can be used in a vehicle. The map using apparatus may be a portable terminal, for example, a mobile phone, a portable computer, or a navigator, or may be a component that can be used in a portable terminal, or may be a chip that can be used in a portable terminal.

According to a seventh aspect, this application provides a map. The map includes map information, the map information indicates that there is an association relationship between a first event and a second event, the map information includes association type information, the association type information indicates a type of the association relationship, and the first event and the second event are events in the map.

The map is a map product, and may be specifically a map data product that carries map information, for example, a map update data packet; or may be a map application product that loads map information, for example, a map application that can be installed on a vehicle or a portable terminal; or may be a map display product that presents map information in a form of a graph and/or text, for example, a paper map or an electronic navigator.

Optionally, the type of the association relationship includes that the first event is a cause event of the second event, or the first event is a result event of the second event.

Optionally, the map information further includes an association factor, and the association factor indicates a degree of correlation between the first event and the second event.

Optionally, the map information further includes a time correlation factor, and the time correlation factor indicates a degree of time correlation between the first event and the second event.

Optionally, the map information further includes at least one of the following: information indicating overlapping duration between a first time range of the first event and a second time range of the second event; information indicating a first intersection over union between the first time range and the second time range; and information indicating a time interval between the first time range and the second time range. The first intersection over union is a ratio of the overlapping duration to duration of a third time range, and the third time range is a union set of the first time range and the second time range.

Optionally, the map information further includes a spatial correlation factor, and the spatial correlation factor indicates a degree of spatial correlation between the first event and the second event.

Optionally, the map information further includes at least one of the following: information indicating an overlapping area between first location data of the first event and second location data of the second event; information indicating a second intersection over union between the first location data and the second location data; information indicating an interval distance between the first location data and the second location data; and information indicating a degree of traffic reachability between the first location data and the second location data. The second intersection over union is a ratio of the overlapping area to an area of third location data, and the third location data is a union set of the first location data and the second location data.

Optionally, the map information further includes a spatiotemporal correlation factor, and the spatiotemporal correlation factor indicates a degree of time and space correlation between the first event and the second event.

Optionally, the first information further includes an attribute correlation factor, and the attribute correlation factor indicates a degree of attribute correlation between the first event and the second event.

Optionally, the map information further includes at least one of the following: information indicating an identifier of the first event; information indicating an identifier of the second event; information indicating an identifier of a map tile in which the first event is located; and information indicating an identifier of a map tile in which the second event is located.

Optionally, the map information is stored in a data structure that is in the map and that is used to describe the first event or the second event.

Optionally, the map information is stored in a data structure that uses the identifier of the first event and the identifier of the second event as a joint index.

According to an eighth aspect, this application provides a computer-readable storage medium. The computer-readable storage medium is configured to store the map according to any one of the seventh aspect or the possible implementations of the seventh aspect. The map includes map information, the map information indicates that there is an association relationship between a first event and a second event, the map information includes association type information, the association type information indicates a type of the association relationship, and the first event and the second event are events in the map.

According to a ninth aspect, this application provides a computer-readable storage medium, including computer instructions. When the computer instructions are run by a processor, the method according to any one of the first aspect or the possible implementations of the first aspect is implemented.

According to a tenth aspect, this application provides a computer-readable storage medium, including computer instructions. When the computer instructions are run by a processor, the method according to any one of the second aspect or the possible implementations of the second aspect is implemented.

According to an eleventh aspect, this application provides a vehicle, including the map using apparatus according to the fourth aspect or the sixth aspect, or including the map using apparatus according to any possible implementation of the fourth aspect or the sixth aspect.

According to a twelfth aspect, this application provides a map system, including the map generation apparatus according to any one of the third aspect, the fifth aspect, the possible implementations of the third aspect, or the possible implementations of the fifth aspect, and the map using apparatus according to any one of the fourth aspect, the sixth aspect, the possible implementations of the fourth aspect, or the possible implementations of the sixth aspect.

According to a thirteenth aspect, this application provides a computer program product. When the computer program product is executed by a processor, the method according to any one of the first aspect or the possible implementations of the first aspect is implemented. For example, the computer program product may be a software installation package. When the method provided in any possible design of the first aspect needs to be used, the computer program product may be downloaded and executed on the processor, to implement the method according to any one of the first aspect or the possible implementations of the first aspect.

According to a fourteenth aspect, this application provides a computer program product. When the computer program product is executed by a processor, the method according to any one of the second aspect or the possible implementations of the second aspect is implemented. For example, the computer program product may be a software installation package. When the method provided in any possible design of the second aspect needs to be used, the computer program product may be downloaded and executed on the processor, to implement the method according to any one of the second aspect or the possible implementations of the second aspect.

According to a fifteenth aspect, this application provides a map data processing method. The method includes: obtaining first information, where the first information indicates that there is an association relationship between at least two events, the at least two events include a first event and a second event, the first information includes association type information, the association type information indicates a type of the association relationship, and the at least two events are events in a map; and storing the first information as data of the map.

In the foregoing method, map information including an association relationship between events in the map is generated. A change of another event caused by a change of an event may be predicted based on the prior information, and a prediction result may be used as a corroboration reference of the change of the another event. This helps quickly and accurately complete update of a large quantity of events in the map, and improves map update efficiency and reliability of driving decision-making.

Optionally, the obtaining first information may be specifically generating the first information or receiving the first information.

When the obtaining first information is generating the first information, the method may be executed by a map server, a component or chip in a map server, a roadside device, a vehicle, or a mobile terminal, or a component or chip in a roadside device, a vehicle, or a mobile terminal. When the obtaining first information is receiving the first information, the method may be executed by a vehicle, a component (for example, a navigation apparatus or an autonomous driving apparatus in a vehicle) in a vehicle, a chip in a vehicle, a portable terminal (for example, a mobile phone, a portable computer, or a navigator), a component in a portable terminal, a chip in a portable terminal, or the like, or may be an application that can be installed and run on a vehicle or a portable terminal.

Optionally, the type of the association relationship includes that the first event is a cause event of the second event, or the first event is a result event of the second event.

In the foregoing implementation, the first event and the second event are causally related. If the first event is a cause event of the second event, it indicates that the second event is affected by the first event. If the first event is a result event of the second event, that is, the second event is a cause event of the first event, it indicates that the first event is affected by the second event.

Optionally, the first information further includes an association factor, and the association factor indicates a degree of correlation between the first event and the second event.

The association factor may be represented by a floating point number of (0, 1]. A larger value of the association factor indicates a stronger degree of correlation between the first event and the second event. The association factor is a comprehensive index, and may represent the degree of correlation between the first event and the second event overall (including a dimension such as time, space, or attribute).

Optionally, the first information further includes a time correlation factor, and the time correlation factor indicates a degree of time correlation between the first event and the second event.

The time correlation factor may be represented by a floating point number of (0, 1]. A larger value of the time correlation factor indicates a stronger degree of time correlation between the first event and the second event.

The degree of time correlation between the first event and the second event may be represented as overlapping duration between a time range of the first event and a time range of the second event, or may be represented as an intersection over union or a time interval between the two time ranges. Therefore, optionally, the first information further includes at least one of the following: information indicating overlapping duration between a first time range of the first event and a second time range of the second event; information indicating a first intersection over union between the first time range and the second time range; and information indicating a time interval between the first time range and the second time range. The first intersection over union is a ratio of the overlapping duration to duration of a third time range, and the third time range is a union set of the first time range and the second time range.

In the foregoing implementation, the overlapping duration, the first intersection over union, and the time interval may all be used to measure the degree of time correlation between the first event and the second event. For example, the time correlation factor may be obtained by performing weighted summation on the overlapping duration, the first intersection over union, and the time interval. When other parameters remain unchanged, larger overlapping duration indicates a larger time correlation factor; when other parameters remain unchanged, a larger first intersection over union indicates a larger time correlation factor; and when other parameters remain unchanged, a smaller time interval indicates a larger time correlation factor. It may be understood that, for details about whether a parameter is positively correlated or negatively correlated with the time correlation factor, refer to a physical meaning of the parameter.

Optionally, the first information further includes a spatial correlation factor, and the spatial correlation factor indicates a degree of spatial correlation between the first event and the second event.

The spatial correlation factor may be represented by a floating point number of (0, 1]. A larger value of the spatial correlation factor indicates a stronger degree of spatial correlation between the first event and the second event.

The degree of spatial correlation between the first event and the second event may be represented as an overlapping area, an interval distance, or an intersection over union between location data covered by the first event and location data covered by the second event, or may be represented as a degree of traffic reachability between the two pieces of location data. Therefore, optionally, the first information further includes at least one of the following: information indicating an overlapping area between first location data of the first event and second location data of the second event; information indicating a second intersection over union between the first location data and the second location data; information indicating an interval distance between the first location data and the second location data; and information indicating a degree of traffic reachability between the first location data and the second location data. The second intersection over union is a ratio of the overlapping area to an area of third location data, and the third location data is a union set of the first location data and the second location data.

In the foregoing implementation, the overlapping area, the second intersection over union, the interval distance, and the degree of traffic reachability may all be used to measure the degree of spatial correlation between the first event and the second event. For example, the spatial correlation factor may be obtained by performing weighted summation on the overlapping area, the second intersection over union, the interval distance, and the degree of traffic reachability. When other parameters remain unchanged, a larger overlapping area indicates a larger spatial correlation factor; when other parameters remain unchanged, a larger second intersection over union indicates a larger spatial correlation factor; when other parameters remain unchanged, a smaller interval distance indicates a larger spatial correlation factor; and when other parameters remain unchanged, a larger degree of traffic reachability indicates a larger spatial correlation factor. It may be understood that, for details about whether a parameter is positively correlated or negatively correlated with the spatial correlation factor, refer to a physical meaning of the parameter.

Optionally, the first information further includes a spatiotemporal correlation factor, and the spatiotemporal correlation factor indicates a degree of time and space correlation between the first event and the second event.

The spatiotemporal correlation factor may be represented by a floating point number of (0, 1]. A larger value of the spatiotemporal correlation factor indicates a stronger degree of time and space comprehensive correlation between the first event and the second event.

Optionally, the first information further includes an attribute correlation factor, and the attribute correlation factor indicates a degree of attribute correlation between the first event and the second event.

The attribute correlation factor may be represented by a floating point number of (0, 1]. A larger value of the attribute correlation factor indicates a stronger degree of attribute correlation between the first event and the second event.

Optionally, the first information further includes at least one of the following: information indicating an identifier of the first event; information indicating an identifier of the second event; information indicating an identifier of a map tile in which the first event is located; and information indicating an identifier of a map tile in which the second event is located.

In the foregoing implementation, indexing based on an identifier of an event can improve event query efficiency.

Optionally, the first information is stored in a data structure that is in the map and that is used to describe the first event or the second event.

Optionally, the first information is stored in a data structure that uses the identifier of the first event and the identifier of the second event as a joint index.

Optionally, the method further includes: obtaining second information, where the second information indicates a current status of the first event; determining, based on the second information, that the first event changes; determining, based on the first information, that the first event meets a preset condition; and updating description information of the second event in the map based on the second information.

In the foregoing implementation, when it is detected that an event changes and meets the preset condition, quick indexing of another event associated with the event can be implemented based on the first information. This improves event searching efficiency and inter-event linkage update efficiency.

Optionally, the preset condition includes at least one of the following: the first event is a cause event of the second event; the first event is a cause event of the second event, and the degree of correlation between the first event and the second event is greater than a first threshold; and there is an association relationship between the first event and the second event, and the degree of correlation between the first event and the second event is greater than a second threshold.

Optionally, the determining that the first event changes includes: determining that the first event disappears; determining that the first event is a new event; or determining that a degree of change of the first event is greater than a third threshold.

In the foregoing implementation, the preset condition is a trigger condition used to update the description information of the second event.

The condition that the first event is a cause event of the second event indicates that the second event is affected by the first event.

Compared with the former condition, the condition that the first event is a cause event of the second event, and the degree of correlation between the first event and the second event is greater than a first threshold adds a limitation on the degree of correlation between the two events. The degree of correlation between the first event and the second event may be measured by at least one of the association factor, the spatiotemporal correlation factor, the time correlation factor, the spatial correlation factor, the attribute correlation factor, and the like.

In the condition that there is an association relationship between the first event and the second event, and the degree of correlation between the first event and the second event is greater than a second threshold, that there is an association relationship between the first event and the second event means that a cause and effect relationship between the first event and the second event cannot be determined, but there is an association relationship between the first event and the second event, and the association relationship may be time correlation, spatial correlation, or spatiotemporal correlation. The association relationship may alternatively be, for example, the first event and the second event occur concurrently, or the first event and the second event disappear concurrently, or the first event aggravates or reduces a degree of the second event.

For example, that the degree of correlation between the first event and the second event is greater than a second threshold may be that at least one of the association factor, the spatiotemporal correlation factor, the time correlation factor, the spatial correlation factor, the attribute correlation factor, and the like between the first event and the second event is greater than the second threshold. Alternatively, the overlapping duration between the time range of the first event and the time range of the second event may be greater than the second threshold, or the overlapping area between the location data of the first event and the location data of the second event is greater than the second threshold. This is not specifically limited in this embodiment of this application.

The determining that a degree of change of the first event is greater than a third threshold may be: The second information includes location data and attribute data of the first event at a current moment, and a value of change of the location data of the first event at the current moment compared with location data of the first event at a historical moment and/or a value of change of the attribute data of the first event at the current moment compared with attribute data of the first event at a historical moment are/is greater than the third threshold.

Optionally, the method further includes updating the first information when the following condition is met: a quantity of changed events in a plurality of events exceeds a fourth threshold; a quantity of disappeared events in a plurality of events exceeds a fifth threshold; the degree of change of the first event exceeds a sixth threshold; or a quantity of new events exceeds a seventh threshold.

In the foregoing implementation, update of description information of an event and update of association information (that is, the first information) between events may be in a dependency sequence, or may be independent and decoupled from each other. Being in a dependency sequence means that the first information is updated after the description information of the event is updated first. Being independent and decoupled from each other means that when the plurality of events meet any one of the foregoing conditions, the update of the first information may be triggered, and the update of the first information does not need to be performed after the update of the description information of the event is completed. This can improve map update efficiency.

Optionally, the method further includes determining, based on the first information, a trustworthiness degree of information sensed by a sensing device.

For example, the first event is a cause event of the second event. When it is determined that a first change occurs on the first event, it may be inferred based on the first information that a second change occurs on the second event. In this case, if the sensing device senses that a third change occurs on the second event, a trustworthiness degree of the third change may be determined based on the second change.

In the foregoing implementation, a change of another event caused by a change of an event may be predicted based on the first information, and a prediction result may be used as a corroboration reference of the change of the another event. This effectively verifies a trustworthiness degree of road condition information obtained during driving, and helps improve accuracy of driving decision-making.

Optionally, the method further includes predicting a status of the second event at a preset future moment based on the first information, a current status of the first event, and a current status of the second event.

In the foregoing implementation, a change of another event caused by a change of an event may be predicted, and the first information may be used as assistance information of autonomous driving. This helps improve accuracy of driving decision-making.

Optionally, the method further includes: when it is detected that the first event changes, determining, based on the first information, that the second event changes; determining a target tile to which the second event belongs in the map; and updating the target tile.

In the foregoing implementation, when it is detected that an event changes, a map tile in which an event associated with the event is located may be quickly indexed with reference to the first information, to update the map tile. This effectively improves map update efficiency, and helps reduce network transmission pressure.

According to a sixteenth aspect, this application provides a map data processing apparatus. The apparatus includes: a first obtaining unit, configured to obtain first information, where the first information indicates that there is an association relationship between at least two events, the at least two events include a first event and a second event, the first information includes association type information, the association type information indicates a type of the association relationship, and the at least two events are events in a map; and a storage unit, configured to store the first information as data of the map.

Optionally, the obtaining unit is specifically configured to generate the first information or receive the first information.

Optionally, the type of the association relationship includes that the first event is a cause event of the second event, or the first event is a result event of the second event.

Optionally, the first information further includes an association factor, and the association factor indicates a degree of correlation between the first event and the second event.

Optionally, the first information further includes a time correlation factor, and the time correlation factor indicates a degree of time correlation between the first event and the second event.

Optionally, the first information further includes at least one of the following: information indicating overlapping duration between a first time range of the first event and a second time range of the second event; information indicating a first intersection over union between the first time range and the second time range; and information indicating a time interval between the first time range and the second time range. The first intersection over union is a ratio of the overlapping duration to duration of a third time range, and the third time range is a union set of the first time range and the second time range.

Optionally, the first information further includes a spatial correlation factor, and the spatial correlation factor indicates a degree of spatial correlation between the first event and the second event.

Optionally, the first information further includes at least one of the following: information indicating an overlapping area between first location data of the first event and second location data of the second event; information indicating a second intersection over union between the first location data and the second location data; information indicating an interval distance between the first location data and the second location data; and information indicating a degree of traffic reachability between the first location data and the second location data. The second intersection over union is a ratio of the overlapping area to an area of third location data, and the third location data is a union set of the first location data and the second location data.

Optionally, the first information further includes a spatiotemporal correlation factor, and the spatiotemporal correlation factor indicates a degree of time and space correlation between the first event and the second event.

Optionally, the first information further includes an attribute correlation factor, and the attribute correlation factor indicates a degree of attribute correlation between the first event and the second event.

Optionally, the first information further includes at least one of the following: information indicating an identifier of the first event; information indicating an identifier of the second event; information indicating an identifier of a map tile in which the first event is located; and information indicating an identifier of a map tile in which the second event is located.

Optionally, the first information is stored in a data structure that is in the map and that is used to describe the first event or the second event.

Optionally, the first information is stored in a data structure that uses the identifier of the first event and the identifier of the second event as a joint index.

Optionally, the apparatus further includes: a second obtaining unit, configured to obtain second information, where the second information indicates a current status of the first event; and a processing unit, configured to: determine, based on the second information, that the first event changes. The processing unit is further configured to determine, based on the first information, that the first event meets a preset condition. The processing unit is further configured to update description information of the second event in the map based on the second information.

Optionally, the preset condition includes at least one of the following: the first event is a cause event of the second event; the first event is a cause event of the second event, and the degree of correlation between the first event and the second event is greater than a first threshold; and there is an association relationship between the first event and the second event, and the degree of correlation between the first event and the second event is greater than a second threshold.

The processing unit is specifically configured to: determine that the first event disappears; determine that the first event is a new event; or determine that a degree of change of the first event is greater than a third threshold.

The determining that a degree of change of the first event is greater than a third threshold may be: The second information includes location data and attribute data of the first event at a current moment, and a value of change of the location data of the first event at the current moment compared with location data of the first event at a historical moment and/or a value of change of the attribute data of the first event at the current moment compared with attribute data of the first event at a historical moment are/is greater than the third threshold.

Optionally, the processing unit is further configured to update the first information when the following condition is met: a quantity of changed events in a plurality of events exceeds a fourth threshold; a quantity of disappeared events in a plurality of events exceeds a fifth threshold; the degree of change of the first event exceeds a sixth threshold; or a quantity of new events exceeds a seventh threshold.

Optionally, the processing unit is further configured to determine, based on the first information, a trustworthiness degree of information sensed by a sensing device.

Optionally, the processing unit is further configured to predict a status of the second event at a preset future moment based on the first information, the current status of the first event, and a current status of the second event.

Optionally, the processing unit is further configured to: when it is detected that the first event changes, determine, based on the first information, that the second event changes; determine a target tile to which the second event belongs in the map; and update the target tile.

According to a seventeenth aspect, this application provides a map data processing apparatus. The apparatus includes a processor and a memory. The memory is configured to store program instructions, and the processor invokes the program instructions in the memory, to perform the method according to any one of the fifteenth aspect or the possible implementations of the fifteenth aspect. The map data processing apparatus may be a map server, a component or chip in a map server, a roadside device, a vehicle, a portable terminal, or a component or chip in a roadside device, a vehicle, or a portable terminal.

According to an eighteenth aspect, this application provides a computer-readable storage medium, including computer instructions. When the computer instructions are run by a processor, the method according to any one of the fifteenth aspect or the possible implementations of the fifteenth aspect is implemented.

According to a nineteenth aspect, this application provides a computer program product. When the computer program product is executed by a processor, the method according to any one of the fifteenth aspect or the possible implementations of the fifteenth aspect is implemented. For example, the computer program product may be a software installation package. When the method provided in any possible design of the fifteenth aspect needs to be used, the computer program product may be downloaded and executed on the processor, to implement the method according to any one of the fifteenth aspect or the possible implementations of the fifteenth aspect.

According to a twentieth aspect, this application provides a vehicle, including the map data processing apparatus according to the sixteenth aspect or the seventeenth aspect, or including the map data processing apparatus according to any possible implementation of the sixteenth aspect or the seventeenth aspect.

According to a twenty-first aspect, this application provides a map data processing system. The map data processing system includes a first map data processing apparatus and a second map data processing apparatus. The first map data processing apparatus is configured to perform the method according to any one of the first aspect or the possible implementations of the first aspect. The second map data processing apparatus is configured to perform the method according to any one of the second aspect or the possible implementations of the second aspect.

DESCRIPTION OF EMBODIMENTS

Figure 1:
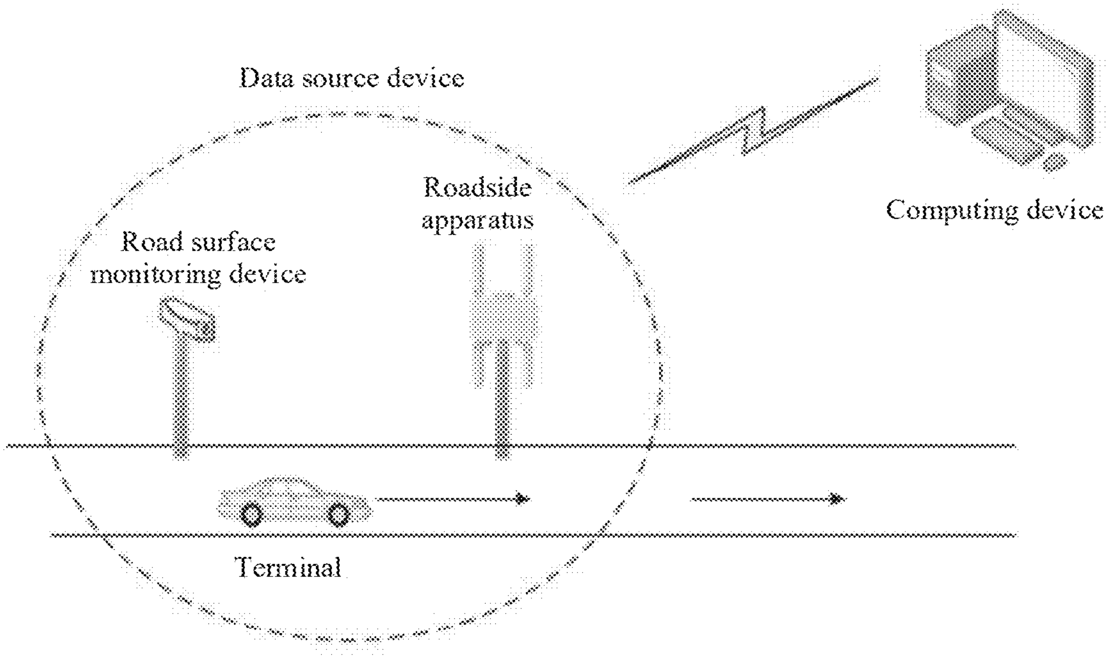
FIG. 1 is a schematic diagram of a system architecture according to an embodiment of this application.

Terms used in embodiments of this application are merely for a purpose of illustrating specific embodiments, and are not intended to limit this application. Terms "first", "second", and the like are used to distinguish between different description objects, but are not used to limit an order of a plurality of description objects or limit a quantity of the description objects, and are not used to distinguish between different entity objects. For example, "first information" is not necessarily prior to "second information". The "first information" may be one piece of information, or may be a plurality of pieces of information. In reality, the "first information" and the "second information" may be same information.

A high definition map includes a plurality of layers. A layer is a map data set with a specific organization structure. Data at a layer is organized in a specific data structure, and can describe information elements from a plurality of sources. Based on time variability of the information elements, the information elements may be classified into two types: elements and events. An element is an information element that is fixed, with small changes, or with a long update periodicity, for example, a road topology, a building location, a lane line, a lane direction, or a traffic infrastructure layout. An event is an information element with strong time-varying characteristic, for example, a traffic accident, a weather change, a road construction, or traffic congestion. In a map, elements and events are recorded at different layers. Information about the elements is carried at a static layer in the map, and information about the events is carried at a dynamic layer in the map. For example, the high definition map includes one static layer and a plurality of dynamic layers. The static layer describes geographical distribution of buildings, roads, traffic lights, and road signs. A dynamic layer 1 describes a real-time speed limit situation, a traffic construction situation, and a passenger and vehicle flow situation of a lane. A dynamic layer 2 describes a weather change, for example, raining, snowing, or wind blowing. It should be noted that, a map description object may have both a time-varying information element and an information element that basically does not change with time, that is, the description object is related to both an element in a map and an event in the map. For example, for a lane, a geographical location of the lane is an element in the map, and a traffic flow of the lane is an event in the map; and for a traffic light, an intersection at which the traffic light is located is an element in the map, and a light-on change of the traffic light is an event in the map.

Static information may specifically include road network structure data, road traffic facility data (for example, a traffic sign or a roadside facility), and the like. The road network structure data may be classified into a region level, a road level, and a lane level. Each region has a unique region identification (ID), and the region ID may also be referred to as a geographical region ID, and a tile ID is generally used. Each region includes a plurality of roads, and each road has a unique road ID. Each road includes a plurality of lanes, and each lane has a unique lane ID. In addition, there is a road topology connection relationship between regions, between roads, and between lanes. It should be noted that a road and a lane may be referred to as map elements in the high definition map.

A tile may be understood as follows: A map within a specific range is cut into rectangular raster pictures of several rows and columns based on a specific size and format and different map resolutions, and the rectangular raster picture obtained through cutting is referred to as a tile. A higher resolution of the map indicates a larger quantity of times of cutting, a larger quantity of tiles included in the map, and higher level of tiles. When a cutting mode is cross cutting, a tile of a specific level includes four tiles of a corresponding higher level.

For example, a tile 1 is a tile of a specific level in the map, and four tiles of a level higher than that of the tile 1 are further generated by performing cross-cutting on the tile 1, respectively identified as 1-00, 1-01, 1-10, and 1-11. It may be understood that geographical coverage of the tile 1 is a union set of geographical coverage of the tile 1-00, geographical coverage of the tile 1-01, geographical coverage of the tile 1-10, and geographical coverage of the tile 1-11.

Dynamic information describes an event, for example, a road construction event, a road maintenance event, a snowstorm cold event, a rainstorm event, a traffic accident event, a traffic congestion event, a temporary speed limit event, a lane topology event, or a road surface icing event. In addition, there is an association relationship between the events. For example, the road construction event affects the traffic congestion event, and the road surface icing event causes the traffic accident event.

When an event changes, the map needs to be updated in time to ensure accuracy of information provided by the map. Because a status of the event changes quickly, the dynamic information in the map needs to be updated in real time.

Richness of information in an existing map cannot meet a use requirement. Therefore, embodiments of this application provide a map data processing method, so that a map includes an association relationship between events. Therefore, when a changed event is detected, an associated event affected by the changed event and associated update of the associated event can be quickly determined based on the association relationship between the events. This improves update efficiency of the event in the map, ensures accuracy and reliability of dynamic information provided by the map, and helps improve accuracy of a driving decision made by a vehicle.

The following describes technical solutions of this application with reference to accompanying drawings.

FIG. 1 is an example diagram of an architecture of a system. In an embodiment of this application, the system may be used to generate a map. Data used to generate the map may include event association information, and the event association information indicates that there is an association relationship between events in the map. In some possible embodiments, the map further includes description information of each event. As shown in FIG. 1, the system includes at least a data source device and a computing device. The data source device and the computing device may be connected for communication in a wireless manner or a wired manner, or data collected by the data source device may be transferred to the computing device by using a removable storage medium such as a removable hard disk. In another possible implementation, the data source device and the computing device may alternatively be integrated on a same hardware device, and are different software or hardware modules on the same hardware device.

The data source device is configured to provide the computing device with basic data including an event (the data source device and the computing device may be a same device). The computing device obtains basic event information based on the basic data provided by the data source device, where the basic event information includes descriptions of time and a status of each event in the map; and then generates event association information based on the basic event information, where the event association information indicates an association relationship between events in the map. In some possible embodiments, when detecting, based on real-time data provided by the data source device, that an event changes, the computing device may update, based on a current status of the event, description information of an associated event affected by the event and association information between the event and the associated event. It should be noted that the map may be a high definition map, or another type of map including a region, a road, and a lane. This is not specifically limited in this embodiment of this application.

The data source device includes but is not limited to a terminal, a roadside apparatus, and the like. The roadside apparatus is configured to obtain road information, traffic condition information, and the like of wide location data. The roadside apparatus may include a roadside unit (RSU), a multi-access edge computing (MEC) apparatus, a sensor, or the like, for example, may be an RSU, MEC, or a sensor, or may be a system including an RSU and MEC, or may be a system including an RSU and a sensor, or may be a system including an RSU, MEC, and a sensor. The terminal may obtain road information, traffic condition information, and the like by using a sensor of the terminal. The terminal may be a vehicle, an on board unit (OBU), an intelligent wearable device (for example, a sports band or a watch), or another sensor or device that can communicate with the computing device, such as a portable mobile device (for example, a mobile phone or a tablet) or a component or chip of a portable mobile device. This is not specifically limited in this embodiment of this application. In some possible embodiments, the data source device may alternatively be a device used by a traffic management department to provide traffic road condition data, or the like.

The map may be generated by the computing device, and the computing device may be a device having a computing function, for example, a computer, a server, a component or chip in a server, or multi-access edge computing (MEC). It should be noted that the computing device may be a cloud computing server, or may be an edge computing server. The computing device may be an integrated device, or may be a plurality of distributed devices. This is not specifically limited in this embodiment of this application.

The map may be released by using a mobile communication network or a V2X (Vehicle to Everything, Internet of Vehicles). For example, a map server on the cloud may release updated map information to a portable terminal handheld by a pedestrian by using a mobile communication network including a base station, or may forward the updated map information to the portable terminal by using a roadside device by using V2X communication. To meet a real-time requirement, update frequency of the high definition map is calculated by day, hour, or minute.

Because both the roadside device and the terminal device have an information collection capability and a computing capability, the roadside device and the terminal device may not only serve as a map receiver and a user, but also serve as a map producer to locally generate the map information for use by the roadside device and the terminal device, or to send the map information to another roadside device or terminal device. In this way, the roadside device and the terminal device are both data source devices and computing devices.

The computing device in FIG. 1 may alternatively be a terminal. The data source device communicates with the terminal in a wireless manner. For a description of the data source device, refer to the related description of the data source device. The terminal may be hardware or an apparatus that needs to use a map, for example, a vehicle or an on board unit (OBU). In this case, the terminal stores a map that includes basic event information and event association information, and the terminal may perform at least one operation of sensed information fusion, event prediction, and map tile update based on the event association information.

It should be noted that, in the foregoing systems, communication between data source devices, and between a data source device and a computing device or a terminal may use a cellular communication technology, for example, 2G cellular communication, such as a global system for mobile communication (GSM), or general packet radio service (GPRS); 3G cellular communication, such as wideband code division multiple access (WCDMA), time division-synchronous code division multiple access (TS-SCDMA), or code division multiple access (CDMA); 4G cellular communication, such as long term evolution (LTE); 5G cellular communication; or another evolved cellular communication technology. A wireless communication system may alternatively communicate with a wireless local area network (WLAN) by using a non-cellular communication technology, for example, Wi-Fi. In some embodiments, direct communication between the foregoing devices may also be performed by using an infrared link, Bluetooth, or ZigBee. In some embodiments, communication between the foregoing devices may alternatively use another wireless protocol, for example, various vehicle communication systems. For example, the system may include one or more dedicated short range communications (DSRC) devices. These devices may include public and/or private data communication between vehicles and/or roadside stations. This is not specifically limited in this application.

It should be noted that FIG. 1 is merely an example of an architectural diagram, but a quantity of network elements included in the communication system shown in FIG. 1 is not limited. In addition to functional entities shown in FIG. 1, another functional entity may be included in FIG. 1 although it is not shown in FIG. 1. In addition, the method provided in embodiments of this application may be applied to the communication system shown in FIG. 1. Certainly, the method provided in embodiments of this application may alternatively be applied to another communication system. This is not limited in embodiments of this application.

In this embodiment of this application, an event is an object that changes with time and lasts for specific duration in the map. For example, the event may be a traffic accident event, a traffic congestion event, a road maintenance event, a road surface icing event, a road surface collapse event, a traffic prohibition event, a temporary speed limit event, a temporary lane topology connection event, a snowstorm cold event, a rainstorm event, or the like.

Figure 2A:
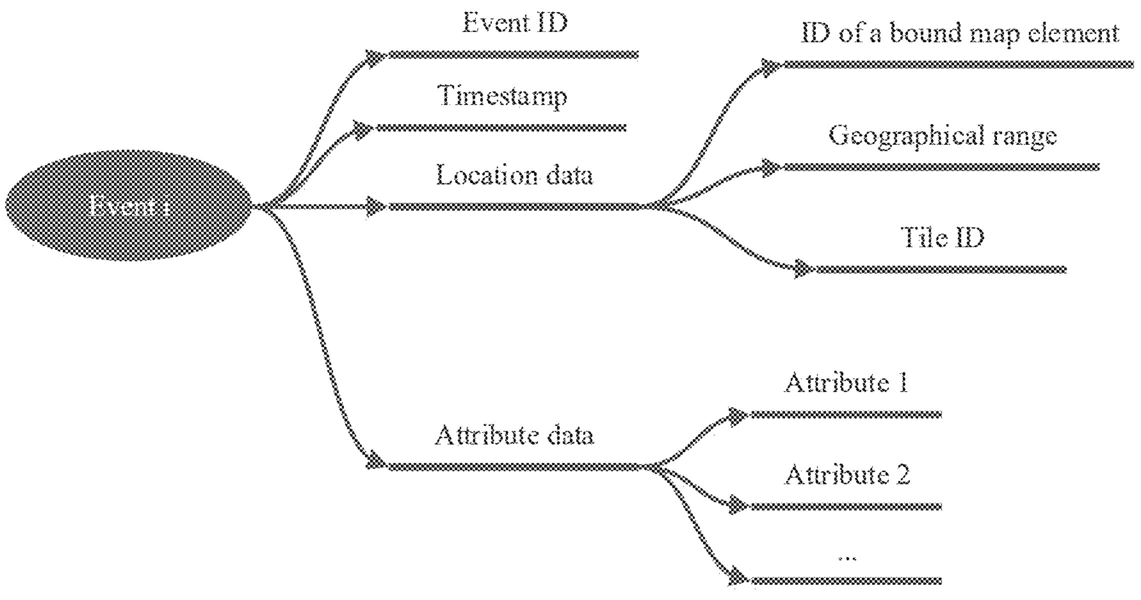
FIG. 2A is a schematic diagram of a type of description information of an event according to an embodiment of this application.

The basic event information includes description information of a plurality of events in the map. FIG. 2A is an example of content included in description information of an event, including an event identifier, time information, and event information.

The event identifier (ID) is used to uniquely identify an event in the map, and may be a combination of one or more characters. The character may be one or more of a number, a letter, and another symbol, for example, a combination of one or more numbers, or a combination of one or more data and letters.

The time information may be a field used to indicate a year, a month, a day, an hour, or a minute, and indicates start time, end time, or duration of the event; or may be a timestamp as shown in FIG. 2A, and indicates a moment at which the event occurs or a moment at which the basic event information is obtained.

The event information may include location data and attribute data.

The location data of the event indicates a location at which the event occurs. For example, the location data may include one or more of an ID of a tile in which the event is located, an ID of a bound map element, a geographical partition ID, longitude and latitude information, absolute coordinates, or relative coordinates. The location data may further represent location data covered by the event. In this embodiment of this application, the location data of the event may be further represented in another manner. In a specific implementation, when the location data of the event is represented as a regular shape, the location data of the event may be represented by using one or more parameters, such as a distance or coordinates, relative to a reference point (for example, a start point of a lane or a road). For example, the location data of the event is a section of road, and the reference point is a start point of the road. In this case, (120 m, 140 m) means starting at a position 120 m away from the reference point and ending at a position 140 m away from the reference point. Alternatively, the location data of the event is represented by using geographical coordinates of two end points of the road. In another specific implementation, when the location data of the event is represented as an irregular shape, the location data of the event may be represented by geographical coordinates of a plurality of corner points of the irregular shape.

The attribute data of the event indicates a feature or a status of the event. In this embodiment of this application, different events have different attributes. First, the attribute data may include a type code of the event. For example, a road surface icing event is indicated with 0001, a traffic accident event is indicated with 0002, a rainstorm event is indicated with 0003, and a traffic congestion event is indicated with 0004. Further, different types of events may have attribute data indicating different content. For example, attributes of the road surface icing event include an ice thickness, an ice surface friction coefficient, and the like; attributes of the traffic accident event include an accident type, a motion status parameter of the vehicle when the accident occurs, a model of the vehicle on which the accident occurs, and the like; attributes of the rainstorm event include rainfall, a warning level, a wind speed, a wind direction, and the like; and attributes of the traffic congestion event include a congestion length, a congestion time period type, a congestion degree, and the like. This is not specifically limited in this embodiment of this application.

A specific example is used to describe the description information of the event.

For example, description information of a traffic congestion event A includes that an event identifier is A and a timestamp is a moment 1, indicating that the traffic congestion event A occurs at the moment 1. Location data of the traffic congestion event A includes a tile 1, a lane 1, and (100 m, 400 m), indicating that the traffic congestion event A occurs on the lane 1 in a region 1, and the location data starts at a position 100 m away from start point coordinates of the lane 1 and ends at a position 400 m away from the start point coordinates of the lane 1. Attribute data of the traffic congestion event A includes a congestion length, a congestion time period type, a congestion degree, and the like.

In this embodiment of this application, the ID of the bound map element of the event may be a lane ID, a road ID, or the like. It should be noted that a quantity of IDs of bound map elements of the event is not specifically limited in this embodiment of this application, and the quantity of IDs of bound map elements of the event is related to the location data occupied by the event.

Figures 2B, 3:
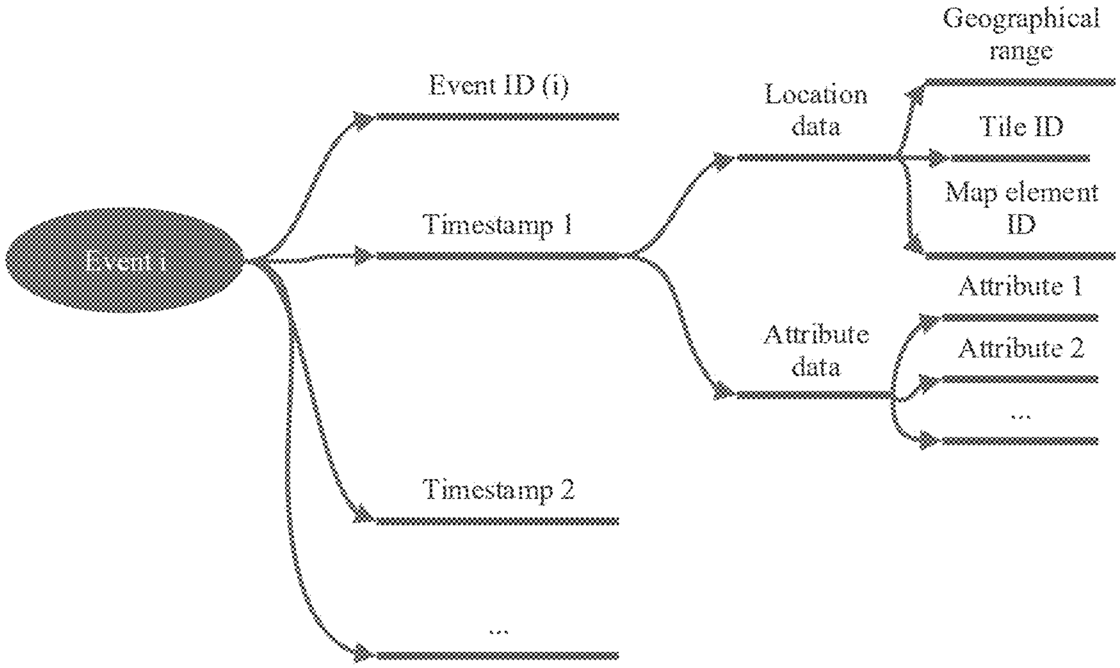
FIG. 2B is a schematic diagram of another type of description information of an event according to an embodiment of this application.
FIG. 3 is a schematic diagram of a parameter matrix of inter-event association information according to an embodiment of this application.

In this embodiment of this application, because the event dynamically changes, the description information of the event may also include event information of the event at a plurality of moments. FIG. 2B is another example of content included in the description information of the event, including event information of the event at a plurality of moments. Each piece of time information has corresponding event information, and event information, such as location information and attribute information, of the event at a corresponding moment may be determined by using an event ID and the time information. In FIG. 2B, description information of an event i includes an event ID of the event i, and location data and attribute data of the event i at at least one historical moment (for example, a timestamp 1 and a timestamp 2). For example, it can be learned from FIG. 2B that the location data of the event i at the timestamp 1 includes the location data, a tile ID, and a map element ID, and the attribute data of the event i at the timestamp 1 includes an attribute 1 and an attribute 2.

It may be understood that an event ID of a same event at different timestamps remains unchanged, but the same event may have different states at the different timestamps. For example, at least one of location data and attribute data of the event changes with time. Event information of each event at different time may be recorded. For example, event information of each event at different time may be stored in a basic event information base, so that different index conditions may be set based on a requirement to obtain corresponding event information. For example, event information of an event at different time may be indexed based on an event ID, or one or more events that occur at specific time or in a specific time period may be indexed based on time information, or event information of the event at specific time or in a specific time period may be indexed based on the event ID and the time information.

In this embodiment of this application, if event description information of an event has a plurality of timestamps, the plurality of timestamps may form a time range of the event. For example, if the description information of the event i includes three timestamps: a timestamp 1 (9:00 AM), a timestamp 2 (9:10 AM), and a timestamp 3 (9:20 AM), a time range of the event i is 9:00 AM to 9:20 AM.

In this embodiment of this application, description information of each event in the map may be stored based on a requirement and a time period, for example, may be stored by day or hour as a timestamp, to save storage space.

The event association information may be generated based on the basic event information, and the event association information indicates an association relationship between a plurality of groups of related two events in the map. For example, the event association information indicates that there is an association relationship between a first event and a second event. In this embodiment of this application, the event association information includes association type information, and the association type information indicates a type of the association relationship.

Specifically, the type of the association relationship between the first event and the second event includes any one of the following:

Type 1: The first event is a cause event of the second event, and the second event is a result event of the first event.

Type 2: The first event is a result event of the second event, and the second event is a cause event of the first event.

Type 3: The first event and the second event are related to each other, that is, the first event and the second event affect each other, but a cause and effect relationship cannot be determined.

The type 1 or type 2 indicates that the association relationship between the first event and the second event is a cause and effect relationship, and the type 3 indicates that the association relationship between the first event and the second event is a correlation relationship. It should be noted that the correlation relationship means that there is impact or an association between two events but no cause and effect relationship can be determined. For example, the first event and the second event occur concurrently, or the first event and the second event disappear concurrently, or the first event aggravates or reduces a degree of the second event. It should be noted that the event association information may be obtained by performing association relationship analysis and calculation based on the description information of each event in the basic event information.

For example, a cold snow day easily causes road surface icing. In this case, there is a cause and effect relationship between a snowstorm event and a road surface icing event. Specifically, the snowstorm event is a cause event of the road surface icing event, and the road surface icing event is a result event of the snowstorm event. For another example, a traffic congestion event and a temporary speed limit event are related to each other, and a road surface icing event is a related event of a traffic accident event.

In this embodiment of this application, the event association information further includes an association factor, and the association factor indicates an association degree or association strength between the first event and the second event. The association factor may be obtained by performing correlation analysis based on description information of the first event and description information of the second event. The association factor is a comprehensive index used to measure overall strength of the association relationship between the first event and the second event.

The association factor may be represented by a floating point number of (0, 1]. A larger value of the association factor indicates a stronger degree of association between the first event and the second event.

In this embodiment of this application, the event association information may further include one or more of a time range intersection parameter, a time intersection over union parameter, a time distance parameter, and the like. The time range intersection parameter indicates overlapping duration of time ranges of two events (namely, the first event and the second event). The time intersection over union parameter indicates a ratio of an intersection set (namely, the overlapping duration) of the time ranges of the two events to a union set of the time ranges of the two events. The time distance parameter indicates interval duration between the time ranges of the two events. It should be noted that, because description information of an event is stored in sequence based on timestamps, a time range of the event may be determined based on a plurality of historical timestamps (or referred to as historical moments) of the event.

For example, it is assumed that a time range of an event 1 is 9:00 AM to 9:20 AM, and a time range of an event 2 is 9:10 AM to 9:30 AM. It can be learned that the time range of the event 1 overlaps with the time range of the event 2, an intersection set of the time ranges is 9:10 AM to 9:20 AM, overlapping duration is 10 minutes, a union set of the time ranges of the two events is 9:00 AM to 9:30 AM, a time range union set parameter is 30 minutes, a time intersection over union parameter is 0.33 (10/30), and a time distance parameter is 0. It may be understood that, if the time range of the event 1 is 9:00 AM to 9:20 AM, and the time range of the event 2 is 9:30 AM to 9:40 AM, it can be learned that the time range of the event 1 does not overlap with the time range of the event 2, and the time distance parameter is 10 minutes.

It should be noted that a time correlation factor may be obtained by performing weighted sum calculation on the time range intersection parameter, the time intersection over union parameter, and the time distance parameter. Generally, when other parameters remain unchanged, a larger time range intersection parameter indicates a larger time correlation factor; when other parameters remain unchanged, a larger time intersection over union parameter indicates a larger time correlation factor; and when other parameters remain unchanged, a smaller time distance parameter indicates a larger time correlation factor. It may be understood that, for details about whether a parameter is positively correlated or negatively correlated with the time correlation factor, refer to a physical meaning of the parameter.

In this embodiment of this application, the event association information may further include a spatial correlation factor, and the spatial correlation factor indicates a degree of correlation between the first event and the second event in a space dimension.

In this embodiment of this application, the event association information further includes one or more of a spatial distance parameter, an overlapping region area parameter, a region intersection over union parameter, a topology connectivity parameter, and the like. The spatial distance parameter indicates an interval distance between two events (namely, the first event and the second event), the overlapping region area parameter indicates an area of an overlapping region of location data of the two events, the region intersection over union parameter indicates a ratio of an intersection set of the location data of the two events to a union set of the location data of the two events, and the topology connectivity parameter indicates a degree of traffic reachability between the location data of the two events. The topology connectivity parameter may be determined based on a quantity of map elements that implement traffic reachability of the location data of the two events and lengths of the map elements. When the quantity of map elements that implement traffic reachability of the location data of the two events is closer to 1 and the lengths of the map elements are shorter, the degree of traffic reachability between the location data of the two events is larger. In other words, when the topology connectivity parameter is smaller, the degree of traffic reachability between the location data of the two events is larger, and the degree of correlation between the two events in the space dimension is higher.

For example, the topology connectivity parameter may indicate a sum of the quantity of map elements that implement traffic reachability of the location data of the two events and a sum of the lengths of the map elements. For example, a lane 1 and a lane 2 are connected, and the lane 1 and the lane 2 are connected between location data of an event 1 and location data of an event 2. The lane 1 is connected to the lane 2. When running, a vehicle sequentially passes through the location data of the event 1, the lane 1, the lane 2, and the location data of the event 2. That is, the lane 1 and the lane 2 implement traffic reachability between the location data of the event 1 and the location data of the event 2. In this case, a formula for expressing a topology connectivity parameter between the two events may be: 2+a length of the lane 1+a length of the lane 2.

It should be noted that the spatial correlation factor may be obtained by performing weighted sum calculation on the spatial distance parameter, the overlapping region area parameter, the region intersection over union parameter, and the topology connectivity parameter. Generally, when other parameters remain unchanged, a smaller spatial distance parameter indicates a larger spatial correlation factor; when other parameters remain unchanged, a larger overlapping region area parameter indicates a larger spatial correlation factor; when other parameters remain unchanged, a larger region intersection over union parameter indicates a larger spatial correlation factor; and when other parameters remain unchanged, a smaller topology connectivity parameter indicates a larger spatial correlation factor. It may be understood that, for details about whether a parameter is positively correlated or negatively correlated with the spatial correlation factor, refer to a physical meaning of the parameter.

In this embodiment of this application, the event association information may further include a spatiotemporal correlation factor, and the spatiotemporal correlation factor indicates a degree of correlation between the first event and the second event in time and space dimensions. For example, the spatiotemporal correlation factor may be obtained by performing weighted summation on the time correlation factor and the spatial correlation factor.

In this embodiment of this application, the event association information may further include an attribute correlation factor, and the attribute correlation factor indicates a degree of correlation between the first event and the second event in an attribute dimension.

In this embodiment of this application, the event association information further includes an identifier of the first event, an identifier of the second event, an identifier of a map tile in which the first event is located, and an identifier of a map tile in which the second event is located.

Figure 4:
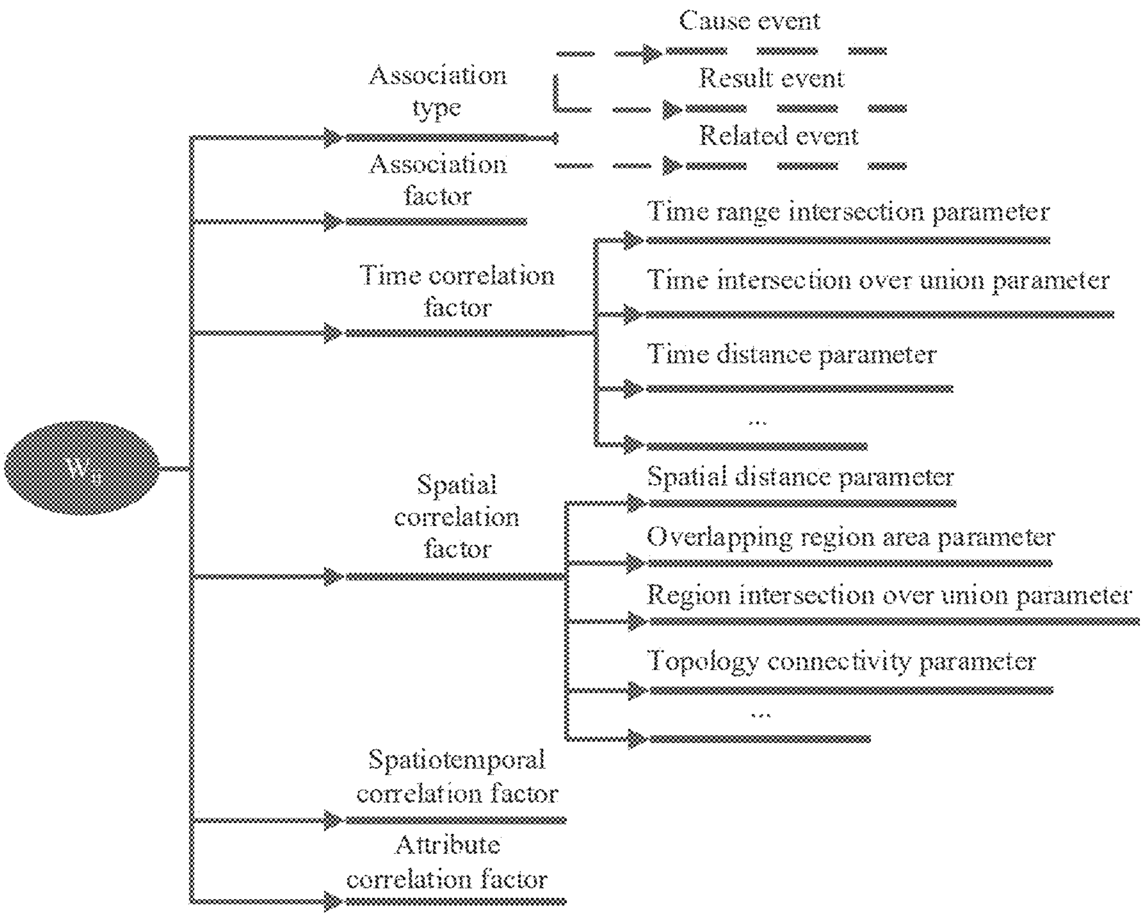
FIG. 4 is a schematic diagram of information about association between two events according to an embodiment of this application.
Figure 5:
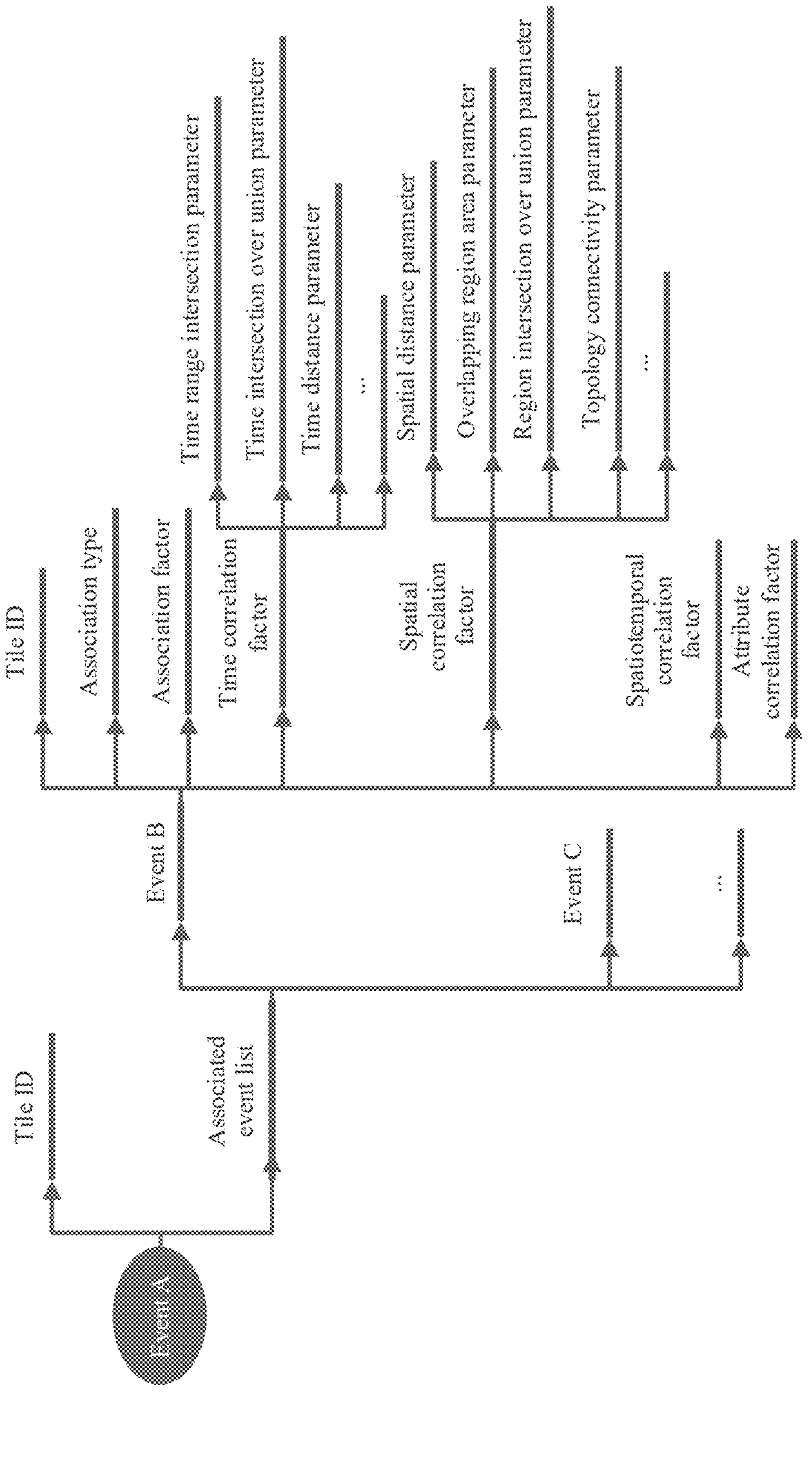
FIG. 5 is a schematic diagram of tree expression of inter-event association information according to an embodiment of this application.

The following describes two representation forms of the event association information provided in this embodiment of this application. The first form is a parameter matrix. To be specific, association information between the first event and the second event is stored in a data structure that uses the identifier of the first event and the identifier of the second event as a joint index. The second form is a tree structure. To be specific, the association information between the first event and the second event is stored in a data structure used to describe the first event or the second event. It should be noted that the following representation forms shown in FIG. 3 to FIG. 5 are for reference only, and an association result between events is not limited to being stored only in the following forms.

First Form: Parameter Matrix

FIG. 3 is a schematic diagram of a parameter matrix according to an embodiment of this application. A gray region in FIG. 3 is a parameter matrix with n rows and n columns, and includes n*n matrix elements, where numbers 1, 2, . . . , and n indicate numbers of n events in basic event information, and n is an integer greater than 0. A cell in the parameter matrix may be a matrix element, indicating whether there is an association relationship between two events corresponding to the cell and specific content of the association relationship. Specifically, content of each matrix element $W_{ij}$ may include an association factor indicating a corresponding event i and event j, where both i and j are integers greater than 0 and less than or equal to n. An association factor in each of $W_{11}$, $W_{22}$, . . . , $W_{nn}$ is set to 1. If there is no association between two events, an association factor in $W_{ii}$ is set to 0 or empty. If the association factor in $W_{ii}$ is not empty, each $W_{ii}$ may further include information indicating an association between the corresponding event i and event j. In other words, $W_{ij}$ may include a data set including the association factor. For example, $W_{21}$ is used to store association information between an event 2 and an event 1, and $W_{12}$ is used to store association information between an event 1 and an event 2.

It should be noted that the parameter matrix shown in FIG. 3 is merely an example. In some possible embodiments, parameters such as an association type and an association factor of a numeric type in association information may alternatively be stored separately. This is not specifically limited in this embodiment of this application.

In this embodiment of this application, a form of the parameter matrix shown in FIG. 3 is merely an example. It may be understood that the parameter matrix shown in FIG. 3 may be a sparse matrix or a symmetric matrix. Because association relationships $W_{ij}$ and $W_{ii}$ between the event i and the event j are the same, association relationships in the association relationship matrix are symmetric relative to a diagonal $W_{11}$ to $W_{nn}$, so that record space may be further reduced. Only records of an upper triangle or a lower triangle in the association relationship matrix are recorded, and records of the diagonal $W_{11}$ to $W_{nn}$ may be excluded. In addition, if there are few events that have an association relationship in the n events, correspondingly, there are few cells that are not empty in the association relationship matrix. In this case, compression processing may be performed on the parameter matrix, to reduce storage space occupied by the parameter matrix, and optimize the parameter matrix.

FIG. 4 is a schematic diagram of association information between two events according to an embodiment of this application. FIG. 4 is also a schematic diagram of content of a non-empty cell $W_{ij}$ in FIG. 3, where $W_{ij}$ indicates association information between the event i and the event j, and content of specifically includes: an association type, where the association type is any one of a cause event, a result event, and a related event, and for example, if the association type is a cause event, it indicates that the event i is a cause event of the event j; an association factor; and at least one of a time correlation factor, a spatial correlation factor, a spatiotemporal correlation factor, and an attribute correlation factor, where for example, the spatiotemporal correlation factor may be obtained by performing weighted summation on the time correlation factor and the spatial correlation factor. The association factor may be obtained by performing weighted summation on the spatiotemporal correlation factor and the attribute correlation factor.

In a specific implementation, content of in FIG. 4 may further include at least one of a time range intersection parameter, a time intersection over union parameter, and a time distance parameter. The time correlation factor may be obtained by performing weighting on the time range intersection parameter, the time intersection over union parameter, and the time distance parameter.

In a specific implementation, content of in FIG. 4 may further include at least one of a spatial distance parameter, an overlapping region area parameter, a region intersection over union parameter, and a topology connectivity parameter. The spatial correlation factor may be obtained by performing weighting on the spatial distance parameter, the overlapping region area parameter, the region intersection over union parameter, and the topology connectivity parameter.

It should be noted that for specific meanings of the parameters shown in FIG. 4, refer to related descriptions of corresponding parameters in the foregoing embodiment. For brevity of the specification, details are not described herein again.

Second Form: Tree Structure

Specifically, an event is used as a unit, and an event associated with the event is determined based on description information of each event in basic event information. Therefore, each event has an associated event list, and the associated event list is used for listing at least one event associated with the event.

For example, for an event A, if the event A is a cause event of an event B, the event A is a result event of an event C, and the event A is a related event of an event D, an associated event list of the event A includes the event B, the event C, and the event D.

FIG. 5 is a schematic diagram of an expression of association information of a single event according to an embodiment of this application. As shown in FIG. 5, an event A is used as an example. Data shown in FIG. 5 specifically includes: an identifier of the event A, an ID of a tile in which the event A is located, an associated event list (including identifiers of events such as an event B and an event C) of the event A, and association information between the event A and each event in the associated event list. The event B in the associated event list is used as an example. Association information between the event A and the event B specifically includes: an ID of a tile in which the event B is located, an association type, and an association factor. The association type is any one of a cause event, a result event, and a related event. For example, if the association type is a result event, it indicates that an event i is a result event of an event j.

In a specific implementation, the association information between the event A and the event B shown in FIG. 5 further includes at least one of a time correlation factor, a spatial correlation factor, a spatiotemporal correlation factor, and an attribute correlation factor. For example, the spatiotemporal correlation factor may be obtained by performing weighted summation on the time correlation factor and the spatial correlation factor. The association factor may be obtained by performing weighted summation on the spatiotemporal correlation factor and the attribute correlation factor.

In a specific implementation, the association information between the event A and the event B shown in FIG. 5 further includes at least one of a time range intersection parameter, a time intersection over union parameter, and a time distance parameter.

In a specific implementation, the association information between the event A and the event B shown in FIG. 5 further includes at least one of a spatial distance parameter, an overlapping region area parameter, a region intersection over union parameter, and a topology connectivity parameter.

It should be noted that for specific meanings of the parameters shown in FIG. 5, refer to related descriptions of corresponding parameters in the foregoing embodiment. For brevity of the specification, details are not described herein again.

It should be noted that association information between the event A and the event C in FIG. 5 may be expressed with reference to the association information between the event A and the event B in FIG. 5. Details are not described herein again.

In conclusion, when event association information indicates an association relationship between a plurality of groups of two associated events, association information between events may be represented in the form shown in FIG. 3 or FIG. 5. Therefore, when it is detected that an event changes, an associated event of the event may be quickly indexed based on the event association information, to reduce time for searching the associated event.

On a basis of establishing event association information between events, a complex association relationship between a plurality of events may be maintained in map data by using a data structure of a graph, that is, an event association graph indicating the association relationship between the plurality of events is established in the map data. The event association graph is a topology structure formed by a plurality of nodes and edges. The node indicates an event, and the edge indicates that two events corresponding to two connected nodes are associated. In the event association graph, if an edge exists between two nodes, it indicates that there is an association relationship between two events corresponding to the two nodes. If no edge exists between two nodes, it indicates that two events corresponding to the two nodes are not associated.

Figure 6:
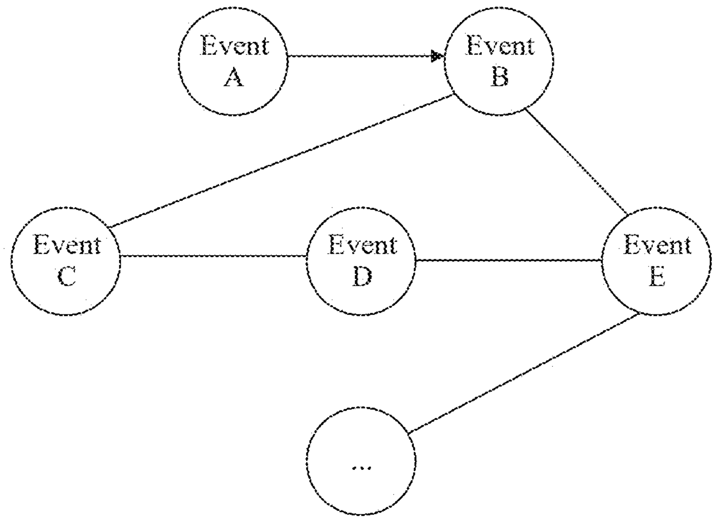
FIG. 6 is a schematic diagram of an event association graph according to an embodiment of this application.

FIG. 6 is an event association graph according to an embodiment of this application. As shown in FIG. 6, a circle indicates a node, and a line segment or a directed line segment that connects two nodes indicates an edge. For example, if a node A unidirectionally points to a node B, it indicates that an event corresponding to the node B is affected by an event corresponding to the node A. It may be understood that, an edge between nodes corresponding to events in a cause and effect relationship with each other is a directed line segment, that is, a node of a cause event points to a node of a result event. If a line segment between the node A and the node B has no direction, it indicates that the event corresponding to the node A and the event corresponding to the node B affect each other. It may be understood that, an edge between nodes corresponding to events in a correlation relationship with each other is undirected. It can be learned that in FIG. 6, the event B is affected by the event A, the event B and an event C affect each other, the event C and an event D affect each other, the event D and an event E affect each other, the event A is not associated with the event C, the event D, and the event E, and the event B is not associated with the event D.

In a specific implementation, an edge in FIG. 6 may further carry a parameter, and the parameter may include at least one of the foregoing association type, association factor, spatiotemporal correlation factor, time correlation factor, spatial correlation factor, attribute correlation factor, and the like.

In a specific implementation, in FIG. 6, different association relationships between events may be distinguished by using colors of edges. For example, if the association relationships are classified into a cause and effect relationship and a correlation relationship, a red edge may indicate a cause and effect relationship, and a blue edge may indicate a correlation relationship. In another specific implementation, different association relationships between events may alternatively be distinguished by using dashed and solid line segments. This is not specifically limited in this embodiment of this application.

In another specific implementation, in FIG. 6, the foregoing association type, that is, the cause event, the result event, and the related event, may alternatively be jointly represented by using a color of an edge and an arrow of the edge. For example, it is assumed that a red edge indicates a cause and effect relationship, and a blue edge indicates a correlation relationship. If the event A in FIG. 6 points to the event B by using a red edge with an arrow, it indicates that the event A leads to the event B, the event A is a cause event, and the event B is a result event. For another example, if there is a blue edge between the event A and the event B, it indicates that the event A and the event B affect each other, and the event A and the event B are related to each other.

In conclusion, after the basic event information and the event association information are generated, if it is detected that an event changes, an association event affected by the event may be radially indexed based on the event association information, to implement linkage update of the changed event in a map and the association event of the event. This helps improve efficiency of linkage update of the event. For a specific updating method, refer to the following description. Details are not described herein again.

Figure 7:
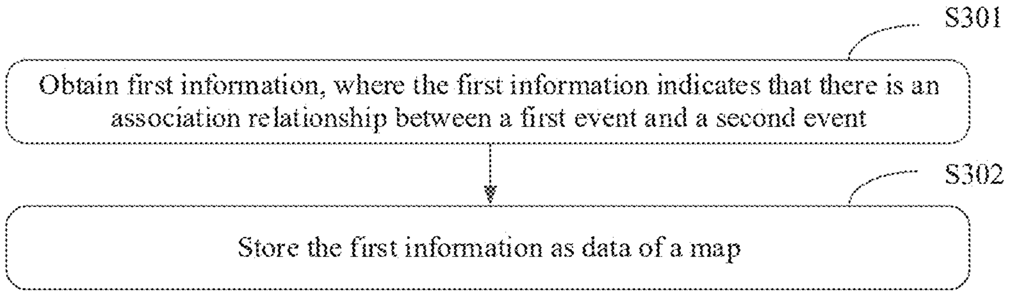
FIG. 7 is a flowchart of a map data processing method according to an embodiment of this application.

Refer to FIG. 7. A map data processing method is provided in an embodiment of this application, and is applied to a map data processing apparatus. The method includes but is not limited to the following steps.

S301: Obtain first information, where the first information indicates that there is an association relationship between at least two events, the at least two events include a first event and a second event, and the at least two events are events in a map.

In this embodiment of this application, obtaining the first information is specifically generating the first information. In this case, the method described in the embodiment in FIG. 7 may be used to generate the map. The method includes but is not limited to being executed on a device, a component, a chip, a software module, or a hardware module at a server side, a roadside device, or a terminal side. The device on the terminal side includes but is not limited to a vehicle or a portable terminal.

Alternatively, in this embodiment of this application, obtaining the first information is specifically receiving the first information. In this case, the method described in the embodiment in FIG. 7 may be used for using the map. The method includes but is not limited to being executed on a device, a component, a chip, a software module, or a hardware module at a server side, a roadside device, or a terminal side. The device on the terminal side includes but is not limited to a vehicle or a portable terminal.

In this embodiment of this application, the first information includes association type information, and the association type information indicates a type of an association relationship between the at least two events, for example, a type of an association relationship between the first event and the second event.

Optionally, the first event may be an existing event in the map, that is, an event that has occurred and is ongoing.

Optionally, the first event may alternatively be a new event.

Optionally, the first event or the second event may be any one of the following: a snowstorm cold event, a rainstorm event, a traffic accident event, a traffic congestion event, a road maintenance event, a road construction event, a road surface icing event, a temporary speed limit event, or a lane topology event.

Optionally, in this embodiment of this application, the type of the association relationship includes that the first event is a cause event of the second event, or the first event is a result event of the second event.

Optionally, in this embodiment of this application, the first information further includes an association factor, and the association factor indicates a degree of correlation between the first event and the second event.

Optionally, the first information further includes a time correlation factor, and the time correlation factor indicates a degree of time correlation between the first event and the second event. It should be noted that the time correlation factor is the time correlation factor in the foregoing embodiment.

Optionally, the first information further includes at least one of the following: information indicating overlapping duration between a first time range of the first event and a second time range of the second event; information indicating a first intersection over union between the first time range and the second time range; and information indicating a time interval between the first time range and the second time range. The first intersection over union is a ratio of the overlapping duration to duration of a third time range, and the third time range is a union set of the first time range and the second time range. It should be noted that, the information indicating the overlapping duration may be the time range intersection parameter in the foregoing embodiment, the information indicating the first intersection over union may be the time intersection over union parameter in the foregoing embodiment, and the information indicating the time interval may be the time distance parameter in the foregoing embodiment.

Optionally, the first information further includes a spatial correlation factor, and the spatial correlation factor indicates a degree of spatial correlation between the first event and the second event. It should be noted that the spatial correlation factor is the spatial correlation factor in the foregoing embodiment.

Optionally, the first information further includes at least one of the following: information indicating an overlapping area between first location data of the first event and second location data of the second event; information indicating a second intersection over union between the first location data and the second location data; information indicating an interval distance between the first location data and the second location data; and information indicating a degree of traffic reachability between the first location data and the second location data. The second intersection over union is a ratio of the overlapping area to an area of third location data, and the third location data is a union set of the first location data and the second location data. It should be noted that, the information indicating the overlapping area may be the overlapping region area parameter in the foregoing embodiment, the information indicating the second intersection over union may be the region intersection over union parameter in the foregoing embodiment, the information indicating the interval distance may be the spatial distance parameter in the foregoing embodiment, and the information indicating the traffic reachability degree may be the topology connectivity parameter in the foregoing embodiment.

Optionally, the first information further includes a spatiotemporal correlation factor, and the spatiotemporal correlation factor indicates a degree of time and space correlation between the first event and the second event. It should be noted that the spatiotemporal correlation factor is the spatiotemporal correlation factor in the foregoing embodiment.

Optionally, the first information further includes at least one of the following: information indicating an identifier of the first event; information indicating an identifier of the second event; information indicating an identifier of a map tile in which the first event is located; and information indicating an identifier of a map tile in which the second event is located.

The association information shown in FIG. 4 may be a specific example of the first information in the embodiment shown in FIG. 7.

S302: Store the first information as data of the map.

In this embodiment of this application, the first information may be stored in a data structure that is in the map and that is used to describe the first event or the second event. For example, the first information may be represented by using the associated event list shown in FIG. 5.

In this embodiment of this application, the first information may alternatively be stored in a data structure that uses the identifier of the first event and the identifier of the second event as a joint index. It should be noted that the first information may be stored in the parameter matrix shown in FIG. 3.

In some possible embodiments, when the obtaining first information is generating the first information, the method may further include: sending the first information, so that a receiving end of the first information performs operations such as sensed information fusion and map tile update based on the first information. When the obtaining first information is receiving the first information, the method may further include: performing operations such as sensed information fusion and map tile update based on the first information. For a specific process, refer to a related description of S402 in the following embodiment in FIG. 11. Details are not described herein again.

It can be learned that, in an implementation of this embodiment of this application, the map includes an association relationship between events in the map, and the association information is used as prior information, so that the map meets more abundant use requirements. For example, a change of another event caused by a change of an event may be predicted based on an association relationship between events in the map, and a prediction result may be further used as a corroboration reference of the change of the another event. This helps quickly and accurately complete update of a large quantity of events in the map, and improves map update efficiency and reliability of driving decision-making.

Figure 8:
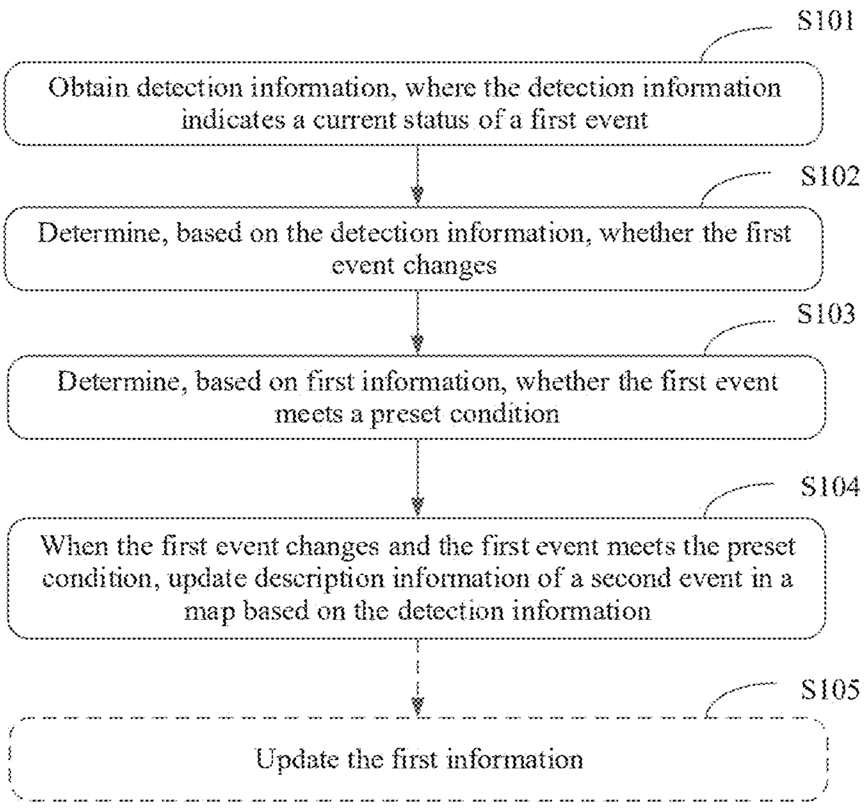
FIG. 8 is a flowchart of a map updating method according to an embodiment of this application.

FIG. 8 is a flowchart of a map updating method according to an embodiment of this application. The map updating method is applied to a map generation apparatus or a map data processing apparatus, for example, a computing device or a terminal, so that a change of an event can be quickly responded to, to implement linkage update of an event in a map. In the method, after steps S301 and S302 in FIG. 7 are performed, the following steps are further performed.

S101: Obtain detection information, where the detection information indicates a current status of a first event.

In this embodiment of this application, the current status of the first event may be reflected by using location data and/or attribute data that are/is updated based on the detection information and related to the first event. The first event may be an event already stored in basic event information, or may be a new event (that is, an event not stored in the basic event information). This is not specifically limited in this embodiment of this application.

The detection information may be obtained from a data source device. For the data source device, refer to the related description of the data source device in FIG. 1. Details are not described herein again.

S102: Determine, based on the detection information, whether the first event changes.

In this embodiment of this application, determining, based on the detection information, that the first event changes includes any one of the following:

(1) determining, based on the detection information, that the first event is a new event;

(2) determining, based on the detection information, that the first event disappears; or (3) determining, based on the detection information and currently stored event information of the first event, that a degree of change of the first event is greater than a preset threshold.

In this embodiment of this application, that the first event changes means that at least one of the location data and the attribute data of the first event changes. That the degree of change of the first event is greater than the preset threshold means that a value of change of location data of the first event at a current moment compared with location data (stored in the basic event information) at a historical moment is greater than the preset threshold, and/or a value of change of attribute data of the first event at the current moment compared with attribute data (stored in the basic event information) of the first event at the historical moment is greater than the preset threshold.

For example, if the first event is a road surface icing event, and it is determined, based on the detection information, that a value of change of an "ice thickness" in attribute data of the road surface icing event exceeds the preset threshold, it indicates that a degree of change of the road surface icing event is greater than the preset threshold.

In this embodiment of this application, before it is determined, based on the detection information, that the first event changes, whether a confidence level of the detection information is greater than a preset truth value may be determined first. When the confidence level of the detection information is greater than the preset truth value, it is determined, based on the detection information, that the first event changes. The confidence level of the detection information may be directly provided by the data source device of the detection information, or may be obtained through calculation by performing data fusion or mutual check on the detection information and other related information.

In this embodiment of this application, determining that the first event changes may alternatively be: a value of change of the association factor between the first event and an associated event is greater than a preset difference threshold, that is, a value of difference between the association factor between the first event and the associated event at a current moment and an association factor at a historical moment is greater than the preset difference threshold. In some possible embodiments, the association factor may alternatively be replaced with the foregoing "time correlation factor", "spatial correlation factor", "attribute correlation factor", or the like. This is not specifically limited in this embodiment of this application.

S103: Determine, based on association information and first information, whether the first event meets a preset condition.

In this embodiment of this application, the first information is the first information in the embodiment shown in FIG. 7, and indicates an association relationship between the first event and a second event. The first information includes an association type, the association factor, and the like. For example, the first information may be represented in the form shown in FIG. 4, that is, the first event is equivalent to the event i in the embodiment in FIG. 4, and the second event is equivalent to the event j in the embodiment in FIG. 4. This is not specifically limited in this embodiment of this application.

In this embodiment of this application, the first information may be obtained from the foregoing event association information, or may be obtained through calculation based on the detection information and description information of each event in the basic event information. This is not specifically limited in this embodiment of this application.

In this embodiment of this application, if it is determined, based on the first information, that the first event does not meet the preset condition, an update operation does not need to be performed. If it is determined, based on the first information, that the first event meets the preset condition, S104 is performed.

In this embodiment of this application, the preset condition includes any one of the following:

(1) The first event is a cause event of the second event.

This may be specifically learned by using the parameter "association type" in the first information.

(2) The first event is a cause event of the second event, and a degree of correlation between the first event and the second event is greater than a first threshold.

That a degree of correlation between the first event and the second event is greater than a first threshold may be that a correlation factor between the first event and the second event is greater than the first threshold.

(3) The first event is a related event of the second event, and a degree of correlation between the first event and the second event is greater than a second threshold.

That the first event is a related event of the second event means that there is an association relationship between the first event and the second event, but this correlation relationship is different from a cause and effect relationship. Specifically, the correlation relationship may be, for example, time correlation and/or spatial correlation between the first event and the second event. It should be noted that the time correlation and spatial correlation between the first event and the second event may be referred to as spatiotemporal correlation between the first event and the second event.

A manner of determining the time correlation between the first event and the second event may be as follows: A spatiotemporal correlation factor between the first event and the second event is greater than the second threshold; a time correlation factor between the first event and the second event is greater than the second threshold; overlapping duration between a time range of the first event and a time range of the second event is not zero (that is, the time range intersection parameter or the time intersection over union parameter is not 0); or interval duration (namely, the time distance parameter) between the time range of the first event and the time range of the second event is less than a preset duration threshold.

A manner of determining the spatial correlation between the first event and the second event may be as follows: A spatiotemporal correlation factor between the first event and the second event is greater than the second threshold; a spatial correlation factor between the first event and the second event is greater than the second threshold; an area of an overlapping region between location data of the first event and location data of the second event is not zero (that is, the overlapping region area parameter or the region intersection over union parameter is not 0); or an interval distance (namely, the spatial distance parameter) between the location data of the first event and the location data of the second event is less than a preset interval threshold.

It should be noted that, that a spatiotemporal correlation factor between the first event and the second event is greater than the second threshold also indicates the spatiotemporal correlation between the first event and the second event.

Therefore, that the first event is a related event of the second event, and a degree of correlation between the first event and the second event is greater than a second threshold specifically includes any one of the following:

- the spatiotemporal correlation factor between the first event and the second event is greater than the second threshold;
- the time correlation factor between the first event and the second event is greater than the second threshold; or
- the spatial correlation factor between the first event and the second event is greater than the second threshold.

In this embodiment of this application, the preset condition may alternatively be: the overlapping duration between the time range of the first event and the time range of the second event is not zero, or the area of the overlapping region between the location data of the first event and the location data of the second event is not zero, or the like. This is not specifically limited in this embodiment of this application.

In this embodiment of this application, the preset condition cannot be that the interval duration between the time range of the first event and the time range of the second event is less than the preset duration threshold. A specific reason is as follows: According to the foregoing definition, although the first event is time-related to the second event, there is an interval between the time range of the first event and the time range of the second event, and it indicates that the first event and the second event occur sequentially. If the first event occurs first and the first event changes, but the second event that occurs later has not occurred this time, or if the first event occurs later and the first event changes, but the second event that occurs first has ended, although the two events are time-related, a change of one event does not trigger update of the other event.

S104: When determining that the first event changes and the first event meets the preset condition, update description information of the second event in the map based on the detection information.

In this embodiment of this application, because the second event is affected by the first event, when the first event meets the preset condition, the description information of the second event in the map may be updated based on the detection information.

Specifically, updating the description information of the second event in the map based on the detection information means: obtaining historical description information of the second event from the basic event information; obtaining prediction information of the second event through prediction based on the detection information and the historical description information of the second event, where the prediction information of the second event includes location data and attribute data of a second target event at a current moment; and finally adding the prediction information of the second event to the description information of the second event, to update the description information of the second event in the map.

In some possible embodiments, if the first event does not meet the foregoing three cases in S102, it indicates that a change amplitude of the first event is small. In this case, the description information of the second event in the basic event information does not need to be updated.

In some possible embodiments, if it is determined in S102 that the first event disappears, in addition to performing S104, description information of the first event may be further deleted.

In some possible embodiments, if it is determined in S102 that the first event is a new event, in addition to performing S104, the detection information may be further added to the map as the description information of the first event.

In some possible embodiments, if it is determined in 102 that the degree of change of the first event is greater than the preset threshold, in addition to performing S104, the detection information may be further added to the description information of the first event, to update the description information of the first event.

It should be noted that update of an event may be transferred. For example, it is determined that an event A is associated with an event B based on association information of the event A, and a change of the event A triggers update of the event B, which is equivalent to that the event B changes. Description information of the updated event B may also be used as the detection information in S101. If the event B also meets the foregoing three cases in S102, update of an event associated with the event B is triggered. This process continues until there is no event affected by the changed event in the map, and the update transfer of the event stops.

It can be learned that, after a change of an event is detected, when change information of an associated event of the event is not reported in time, a latest status of the associated event can be effectively predicted based on an association relationship between the events, to implement linkage update of the event in the map, and improve event update efficiency.

The following uses a specific scenario to describe the foregoing method embodiment.

Figure 9:
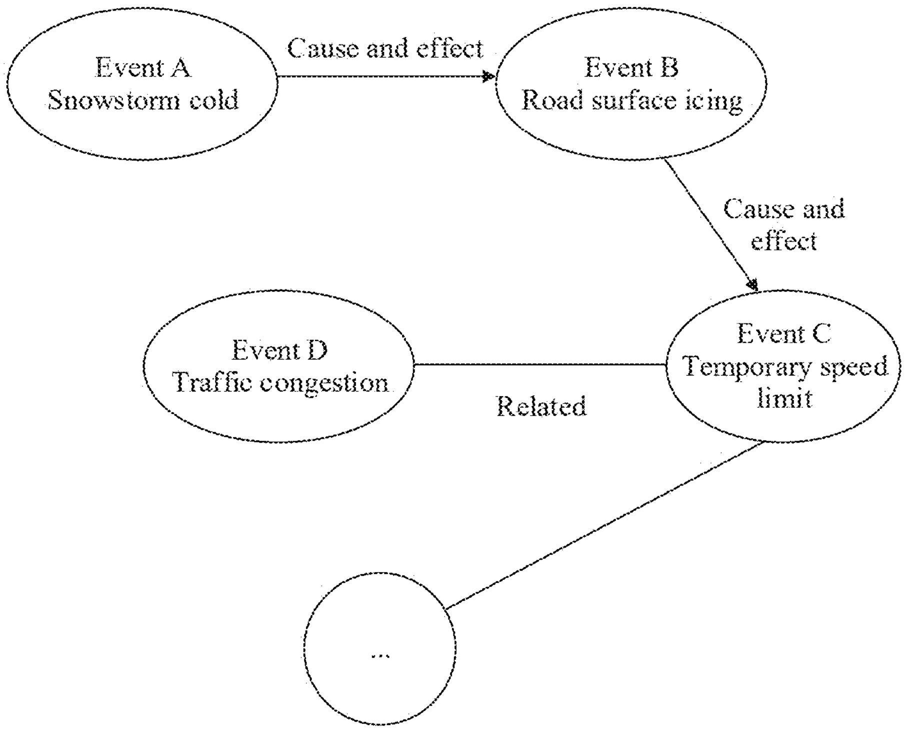
FIG. 9 is a schematic diagram of an event association graph according to an embodiment of this application.

FIG. 9 is an event association graph according to an embodiment of this application. In FIG. 9, an event A is a snowstorm cold event, an event B is a road surface icing event, an event C is a temporary speed limit event, and an event D is a traffic congestion event. An association relationship between the events is as follows: The event A is a cause event of the event B, the event B is a cause event of the event C, and the event C and the event D are related to each other. It is assumed that description information of the five events is stored in basic event information, and the association relationship between the five events is stored in event association information. When it is determined that the event A changes and the event A meets the foregoing preset condition, update of description information of the event B is triggered. When it is determined, based on the description information of the updated event B, that the event B changes and the event B meets the foregoing preset condition, update of description information of the event C is triggered. Similarly, it may be determined, based on the foregoing principle, whether a change of the event C triggers update of description information of the event D.

Optionally, in some possible embodiments, the following step may be further performed.

S105: Update the first information.

Specifically, the first information may be updated based on the detection information and the description information of the updated second event, and/or the first information may be updated based on the updated first event.

In this embodiment of this application, the first information indicates that there is an association relationship between the first event and the second event. For specific content included in the first information, refer to the content shown in FIG. 4. The first event is equivalent to the event i in the embodiment in FIG. 4, and the second event is equivalent to the event j in the embodiment in FIG. 4.

In this embodiment of this application, after the description information of the second event in the map is updated based on the detection information, update of the first information may be further directly triggered. Updating the first information specifically means updating at least one of the association factor, the time correlation factor, the spatial correlation factor, the spatiotemporal correlation factor, and the attribute correlation factor between the first event and the second event.

In this embodiment of this application, updating the first information further includes updating at least one of the time range intersection parameter, the time intersection over union parameter, the time distance parameter, the spatial distance parameter, the overlapping region area parameter, the region intersection over union parameter, and the topology connectivity parameter between the first event and the second event.

In this embodiment of this application, the update operation may be specifically modification, deletion, or addition.

In a specific implementation, when it is determined that the first event disappears, updating the first information means deleting the first information.

For example, in FIG. 3, it is assumed that the first event is an event 1, and the second event is an event 2. If it is determined that the event 1 disappears, deleting the first information means deleting $W_{12}$ in FIG. 3. In some possible embodiments, because the event 1 disappears, $W_{11}$, $W_{13}$, . . . , $W_{1n}$ and $W_{21}$, $W_{31}$, . . . , $W_{n1}$ in FIG. 3 may be further deleted.

In a specific implementation, when it is determined that a degree of change of the first event is greater than the preset threshold, updating the first information means modifying the first information.

For example, in FIG. 3, it is assumed that the first event is an event 1, and the second event is an event 2. If it is determined that a degree of change of the event is greater than the preset threshold, modifying the first information means modifying $W_{12}$ in FIG. 3.

In a specific implementation, when it is determined that the first event is a new event, updating the first information means updating the first information and adding updated first information.

For example, in FIG. 3, it is assumed that the first event is an event n+1, and the second event is an event 2. If it is determined that the event n+1 is a new event, association information between the event n+1 and the event 2 is $W_{(n+1)2}$, and $W_{(n+1)2}$ is added in FIG. 3.

It can be learned that, in an implementation of this embodiment of this application, after a change of an event is detected, association information between the event and another event associated with the event may be quickly updated based on an association relationship between the events.

Figure 10:
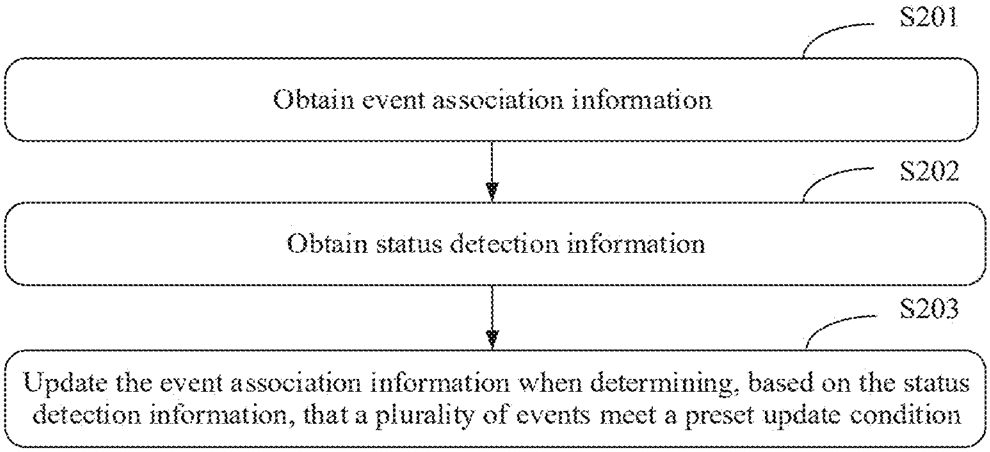
FIG. 10 is a flowchart of another map updating method according to an embodiment of this application.

FIG. 10 is a flowchart of another map updating method according to an embodiment of this application. The method is applied to a map data processing apparatus, for example, a cloud device, a roadside device, or a terminal side device. The method includes but is not limited to the following steps.

S201: Obtain event association information.

In this embodiment of this application, the event association information may indicate an association relationship between a plurality of events in a map, including an association relationship between every two of the plurality of events. For example, the plurality of events include the first event and the second event.

It should be noted that, for details of the event association information, refer to the description about the event association information in the foregoing embodiment. Details are not described herein again.

It should be noted that basic event information further needs to be obtained. For a specific description of the basic event information, refer to the related description of the basic event information in the foregoing embodiment. Details are not described herein again.

S202: Obtain status detection information.

In this embodiment of this application, the status detection information indicates a change status of location data and/or attribute data of the plurality of events in the map.

S203: Update the event association information when determining, based on the status detection information, that the plurality of events meet a preset update condition.

The preset update condition is a trigger condition used to update the event association information. The preset update condition may be the following condition: a quantity of changed events in the plurality of events exceeds a fourth threshold; a quantity of disappeared events in the plurality of events exceeds a fifth threshold; a degree of change of an event in the plurality of events exceeds a sixth threshold; or a quantity of new events exceeds a seventh threshold.

In this embodiment of this application, the preset update condition may alternatively be that a total quantity of events in the plurality of events that meet a condition such as a disappeared event, a new event, or an event whose change degree is greater than the sixth threshold exceeds an eighth threshold. For example, it is assumed that the plurality of events include five events, which are respectively an event 1, an event 2, . . . , and an event 5. If it is detected, based on the status detection information and the basic event information, that the event 1 and the event 2 do not change, the event 3 disappears, the event 4 is a new event, and a change degree of the event 5 is greater than the sixth threshold, it is easily known that a total quantity of events in the plurality of events that meet a condition such as a disappeared event, a new event, or an event whose change degree is greater than the sixth threshold is 3.

In this embodiment of this application, when the preset update condition is met, the event association information is updated. For a specific update process of the association information between every two events in the event association information, refer to the related description of S105 in the embodiment in FIG. 8. Details are not described herein again.

It should be noted that, whether each of the plurality of events meets the preset update condition and a quantity of events that are in the plurality of events and that meet the preset update condition may be determined based on the status detection information and the basic event information.

It can be learned that update of the association information between events and update of the description information of the event may be independent of each other. Based on the association relationship between events, association information between events corresponding to changed events can be quickly updated, to improve map update efficiency.

Figure 11:
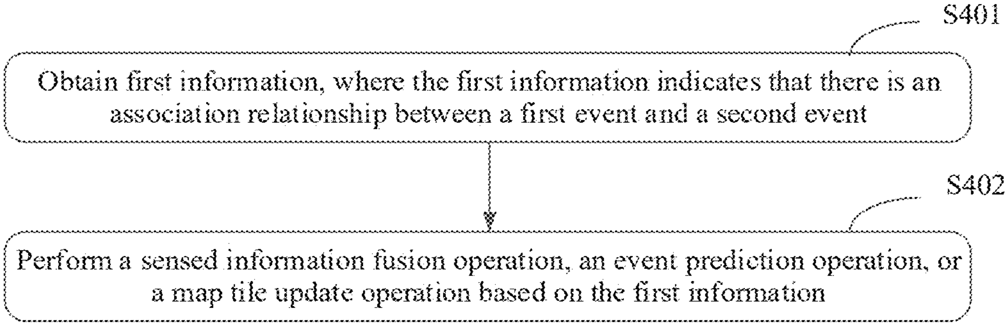
FIG. 11 is a flowchart of a map using method according to an embodiment of this application.

FIG. 11 shows a map using method according to an embodiment of this application. The method is applied to a map using apparatus. The map using apparatus may be a vehicle, a component (for example, a navigation apparatus or an autonomous driving apparatus in a vehicle) in a vehicle, a chip in a vehicle, or the like. Alternatively, the map using apparatus may be a portable terminal, for example, a mobile phone, a portable computer, or a navigator, or may be a component that can be used in a portable terminal, a chip in a portable terminal, or the like. The method may be executed by the map using apparatus, or may be an application installed on the map using apparatus. The method includes but is not limited to the following steps.

S401: Obtain first information, where the first information indicates that there is an association relationship between at least two events, the at least two events include a first event and a second event, the first information includes association type information, the association type information indicates a type of the association relationship, and the at least two events are events in a map.

In this embodiment of this application, obtaining the first information is specifically receiving the first information. The first information may be sent by a map generation apparatus.

In this embodiment of this application, obtaining the first information is specifically generating the first information. For details of this step, refer to the related description of S301 in the embodiment in FIG. 7. Details are not described herein again.

In this embodiment of this application, the type of the association relationship includes that the first event is a cause event of the second event, or the first event is a result event of the second event.

In this embodiment of this application, the first information further includes an association factor, and the association factor indicates a degree of correlation between the first event and the second event.

In this embodiment of this application, the first information further includes at least one of the following: information indicating an identifier of the first event; information indicating an identifier of the second event; information indicating an identifier of a map tile in which the first event is located; and information indicating an identifier of a map tile in which the second event is located.

In this embodiment of this application, the first information is stored in a data structure that is in the map and that is used to describe the first event or the second event.

In this embodiment of this application, the first information is stored in a data structure that uses the identifier of the first event and the identifier of the second event as a joint index.

It should be noted that, for details of the first information, refer to the related description of the first information in S301 in the embodiment in FIG. 7.

S402: Perform an event prediction operation, a sensed information fusion operation, or a map tile update operation based on the first information.

In this embodiment of this application, performing the event prediction operation based on the first information may be predicting a status of the second event at a preset future moment based on the first information, a current status of the first event, and a current status of the second event.

For example, the navigation apparatus in the vehicle receives the first information, and the first information indicates that the first event (for example, a traffic accident event 1) is associated with the second event (for example, a traffic congestion event 2). It is assumed that a front-facing camera of the vehicle detects a current status of the traffic accident event 1. The vehicle predicts a status of the traffic congestion event 2 at a preset future moment based on the current status of the traffic accident event 1, a current status of the traffic congestion event 2 in the map, and the first information, to estimate congestion duration of the traffic congestion event 2. The predicted status of the second event at the preset future moment may be used to generate reminder information, or perform an operation such as path planning.

In this embodiment of this application, performing the sensed information fusion operation based on the first information may be determining, based on the first information, a trustworthiness degree of information sensed by a sensing device.

For example, the sensing device includes but is not limited to a camera of a vehicle, a laser radar, a millimeter wave radar, and the like. The camera of the vehicle is used as an example. It is assumed that during running of the vehicle, after a front-facing camera of the vehicle performs processing and analysis based on a photographed image, it is determined that a traffic accident event occurs in front of the vehicle. In this case, the vehicle obtains, based on the first information, that the traffic accident event has been marked at location data of the detected traffic accident event. This improves a trustworthiness degree of information that is about the traffic accident event and that is detected by the front-facing camera of the vehicle.

In this embodiment of this application, performing the map tile update operation based on the first information may be: when it is detected that the first event changes, determining, based on the first information, that the second event changes; determining a target tile to which the second event belongs in the map; and updating the target tile. Specifically, for a map generation side device, new element description information or new event description information may be generated based on newly obtained sensed information and/or calculated information for all map elements or map events within a tile range, to replace corresponding description information stored in a current map. A map update data packet may be further generated based on the new element description information or the new event description information. The map update data packet is marked with a target tile identifier, and version information or update time information that indicates an updated version. The map update data packet is sent to a map using side apparatus, to replace map data that is about the target tile and that is currently stored in the map using side apparatus. The map using side device may receive the map update data packet, and replace some data about the target tile in the map data currently stored in the map using side device with map data about the target tile in the map update data packet.

For example, before performing map releasing, a map server detects, from basic data sent by a data source device (for details, refer to the related description of the data source device in FIG. 1), that the first event changes; determines, based on the first information, that the second event is affected by the first event; and obtains the target tile of the second event in the map from the map. In this case, the target tile in the map is updated, and the entire map does not need to be updated. This effectively reduces burdens of network transmission.

It can be learned that, in an implementation of this embodiment of this application, map information including association information between events is generated. An event that needs to be referred to in driving decision-making can be predicted or verified based on the map information. This helps improve accuracy of driving decision-making. In addition, a tile including an event associated with a changed event may be preferentially updated or only updated based on an association relationship between the events. This improves map update efficiency.

It should be noted that, both the map generation method and the map using method described in embodiments of this application may be referred to as a map data processing method, and both the map generation apparatus and the map using apparatus described in embodiments of this application may be referred to as a map data processing apparatus.

An embodiment of this application further provides a map system. The map system includes a map generation apparatus and a map using apparatus. The map system is configured to perform the methods described in the foregoing embodiments of this application. The map generation apparatus in this application may be a map server, a component or chip in a map server, a roadside device, a vehicle, a mobile terminal, or a component or chip in a roadside device, a vehicle, or a mobile terminal. The map using apparatus may be a vehicle, a component (for example, a navigation apparatus or an autonomous driving apparatus in a vehicle) in a vehicle, a chip in a vehicle, a portable terminal (for example, a mobile phone, a portable computer, or a navigator), a component in a portable terminal, a chip in a portable terminal, or the like.

Specifically, in the map system, the map generation apparatus is configured to generate, store, and send first information. The first information indicates that there is an association relationship between at least two events, the at least two events include a first event and a second event, the first information includes association type information, the association type information indicates a type of the association relationship, and the at least two events are events in a map. The map using apparatus is configured to: receive the first information, and perform a sensed information fusion operation, an event prediction operation, or a map tile update operation based on the first information.

It should be noted that, the map generation apparatus may be specifically configured to perform the methods described in embodiments of FIG. 8, FIG. 10, and FIG. 7, and the map using apparatus may be specifically configured to perform the map using method described in the embodiment in FIG. 11. Details are not described herein again.

An embodiment of this application further provides a map. The map includes map information, the map information indicates that there is an association relationship between a first event and a second event, the map information includes association type information, the association type information indicates a type of the association relationship, and the first event and the second event are events in the map.

In a specific implementation, the type of the association relationship includes that the first event is a cause event of the second event, or the first event is a result event of the second event.

In a specific implementation, the map information further includes an association factor, and the association factor indicates a degree of correlation between the first event and the second event.

In a specific implementation, the map information further includes a time correlation factor, and the time correlation factor indicates a degree of time correlation between the first event and the second event.

In a specific implementation, the map information further includes at least one of the following: information indicating overlapping duration between a first time range of the first event and a second time range of the second event; information indicating a first intersection over union between the first time range and the second time range; and information indicating a time interval between the first time range and the second time range. The first intersection over union is a ratio of the overlapping duration to duration of a third time range, and the third time range is a union set of the first time range and the second time range.

In a specific implementation, the map information further includes a spatial correlation factor, and the spatial correlation factor indicates a degree of spatial correlation between the first event and the second event.

In a specific implementation, the map information further includes at least one of the following: information indicating an overlapping area between first location data of the first event and second location data of the second event; information indicating a second intersection over union between the first location data and the second location data; information indicating an interval distance between the first location data and the second location data; and information indicating a degree of traffic reachability between the first location data and the second location data. The second intersection over union is a ratio of the overlapping area to an area of third location data, and the third location data is a union set of the first location data and the second location data.

In a specific implementation, the map information further includes a spatiotemporal correlation factor, and the spatiotemporal correlation factor indicates a degree of time and space correlation between the first event and the second event.

In a specific implementation, the map information further includes at least one of the following: information indicating an identifier of the first event; information indicating an identifier of the second event; information indicating an identifier of a map tile in which the first event is located; and information indicating an identifier of a map tile in which the second event is located.

In a specific implementation, the map information is stored in a data structure that is in the map and that is used to describe the first event or the second event.

In a specific implementation, the map information is stored in a data structure that uses the identifier of the first event and the identifier of the second event as a joint index.

Figure 12:
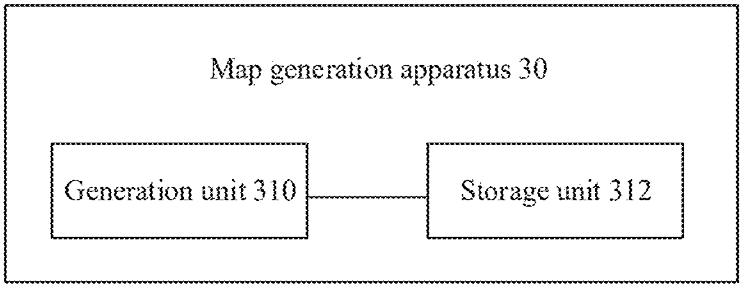
FIG. 12 is a schematic diagram of a functional structure of a map generation apparatus according to an embodiment of this application.

FIG. 12 is a schematic diagram of a functional structure of a map generation apparatus according to an embodiment of this application. A map generation apparatus 30 includes a generation unit 310 and a storage unit 312. The map generation apparatus 30 may be implemented by using hardware, software, or a combination of software and hardware. Details are provided below.

The generation unit 310 is configured to generate first information. The first information indicates that there is an association relationship between at least two events, the at least two events include a first event and a second event, the first information includes association type information, the association type information indicates a type of the association relationship, and the at least two events are events in a map. The storage unit 312 is configured to store the first information as data of the map.

When the method described in the embodiment in FIG. 7 is a map generation method, functional modules of the map generation apparatus 30 may be further configured to implement the method described in the embodiment in FIG. 7. In the embodiment in FIG. 7, the generation unit 310 may be configured to perform S301 of generating the first information, and the storage unit 312 may be configured to perform S302. The functional modules of the map generation apparatus 30 may be further configured to implement the map updating methods described in embodiments of FIG. 8 and FIG. 10. For brevity of the specification, details are not described herein again.

Figure 13:
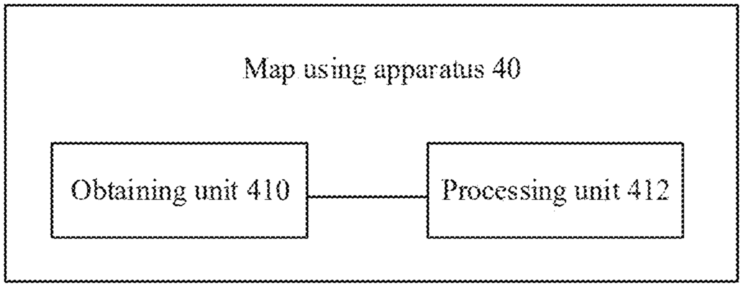
FIG. 13 is a schematic diagram of a functional structure of a map using apparatus according to an embodiment of this application.

FIG. 13 is a schematic diagram of a functional structure of a map using apparatus according to an embodiment of this application. A map using apparatus 40 includes an obtaining unit 410 and a processing unit 412. The map using apparatus 40 may be implemented by using hardware, software, or a combination of software and hardware. Details are provided below.

The obtaining unit 410 is configured to obtain first information. The first information indicates that there is an association relationship between at least two events, the at least two events include a first event and a second event, the first information includes association type information, the association type information indicates a type of the association relationship, and the at least two events are events in a map. The processing unit 412 is configured to perform a sensed information fusion operation, an event prediction operation, or a map tile update operation based on the first information.

Functional modules of the map using apparatus 40 may be further configured to implement the map using method described in the embodiment in FIG. 11. In the embodiment in FIG. 11, the obtaining unit 410 may be configured to perform S401, and the processing unit 412 may be configured to perform S402.

Only one or more of the units in embodiments shown in FIG. 12 and FIG. 13 may be implemented by using software, hardware, firmware, or a combination thereof. The software or firmware includes but is not limited to computer program instructions or code, and may be executed by a hardware processor. The hardware includes but is not limited to various integrated circuits, such as a central processing unit (CPU), a digital signal processor (DSP), a field programmable gate array (FPGA), or an application-specific integrated circuit (ASIC).

This application further provides a schematic diagram of a structure of a map generation apparatus. As shown in FIG.

14, a map generation apparatus 32 includes a processor 321, a communication interface 322, a memory 323, and a bus 324. The processor 321, the memory 323, and the communication interface 322 communicate with each other by using the bus 324. The map generation apparatus 32 may be a server or a map generation apparatus. It should be understood that quantities of processors and memories in the map generation apparatus 32 are not limited in this application. It should be noted that the map generation apparatus may be a map server, or may be a component or chip in a map server. The map generation apparatus may alternatively be a roadside device, a vehicle, a mobile terminal, or a component or chip in a roadside device, a vehicle, or a mobile terminal.

Figure 14:
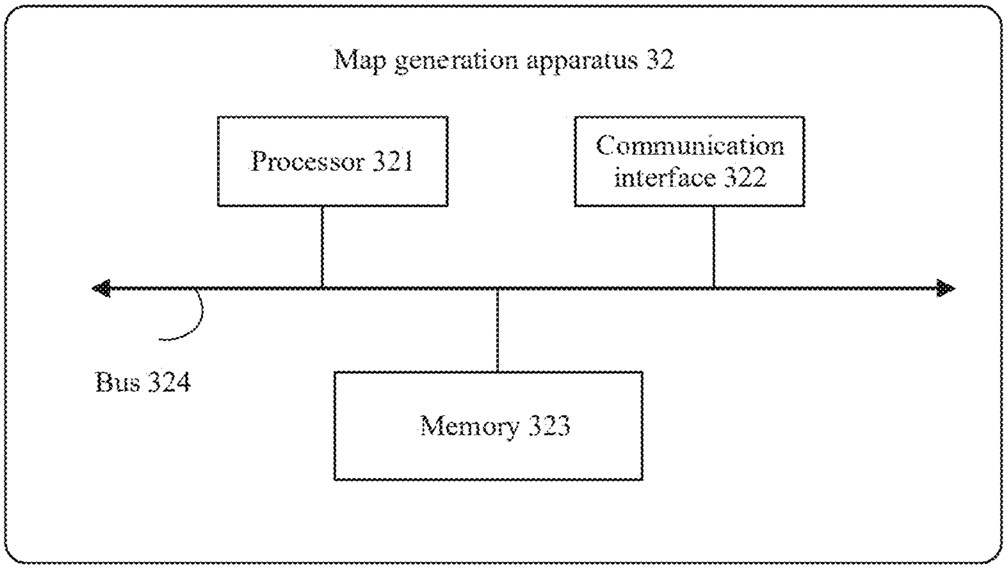
FIG. 14 is a schematic diagram of a structure of a map generation apparatus according to an embodiment of this application.

The bus 324 may be a peripheral component interconnect (PCI) bus, an extended industry standard architecture (EISA) bus, and the like. Buses may be classified into an address bus, a data bus, a control bus, and the like. For ease of representation, only one line is used in FIG. 14 for representation, but it does not indicate that there is only one bus or only one type of bus. The bus 324 may include a channel for transferring information between various components (for example, the memory 323, the processor 321, and the communication interface 322) of the map generation apparatus 32.

The processor 321 may include any one or more of a central processing unit (CPU), a microprocessor (MP), or a digital signal processor (DSP).

The memory 323 is configured to provide storage space, and the storage space may store data such as an operating system and a computer program. The memory 323 may be one or a combination of a random access memory (RAM), an erasable programmable read-only memory (EPROM), a read-only memory (ROM), or a portable read-only memory (CD-ROM). The memory 323 may exist independently, or may be integrated into the processor 321.

The communication interface 322 may be configured to provide an information input or output for the processor 321. Alternatively, the communication interface 322 may be configured to receive data sent from the outside and/or send data to the outside, and may be a wired link interface including an Ethernet cable or the like, or may be a wireless link (for example, Wi-Fi, Bluetooth, universal wireless transmission, or an in-vehicle short-range communication technology) interface. Alternatively, the communication interface 322 may further include a transmitter (for example, a radio frequency transmitter or an antenna), a receiver, or the like coupled to the interface.

The processor 321 in the map generation apparatus 32 is configured to read a computer program stored in the memory 323, and is configured to perform the method described in the embodiment in FIG. 7, FIG. 8, or FIG. 10.

In a possible design, the map generation apparatus 32 may be one or more modules in the map generation apparatus that performs the method shown in FIG. 8, FIG. 10, or FIG. 7. The processor 321 may be configured to read one or more computer programs stored in the memory, and is configured to perform the following operations:

- generating first information, where the first information indicates that there is an association relationship between at least two events, the at least two events include a first event and a second event, the first information includes association type information, the association type information indicates a type of the association relationship, and the at least two events are events in a map; and
- storing the first information as data of the map by using the storage unit 312.

Figure 15:
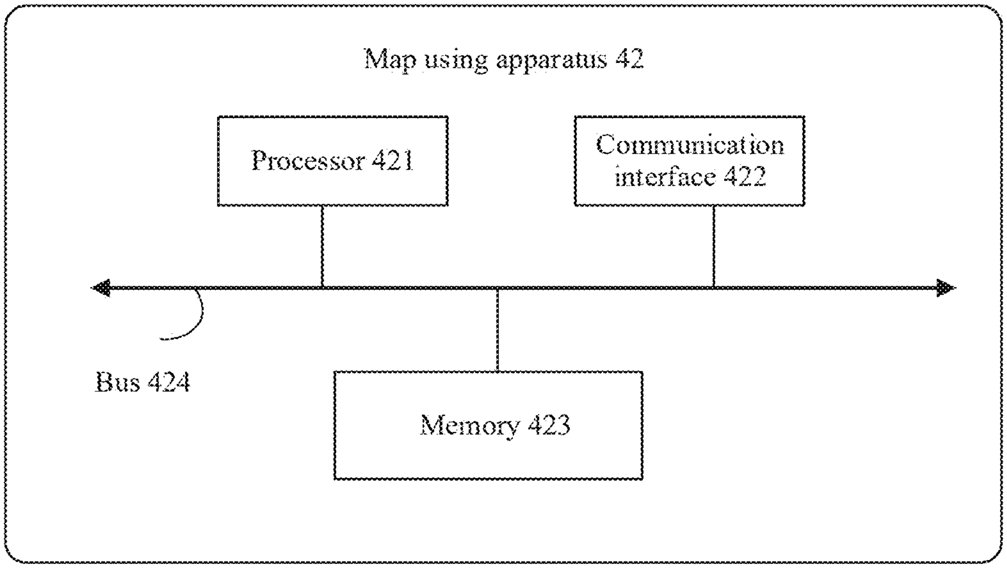
FIG. 15 is a schematic diagram of a structure of another map using apparatus according to an embodiment of this application.

This application further provides a map using apparatus. As shown in FIG. 15, the map using apparatus 42 includes a processor 421, a communication interface 422, a memory 423, and a bus 424. The processor 421, the memory 423, and the communication interface 422 communicate with each other by using the bus 424. The map using apparatus 42 may be a server or a map using apparatus. It should be understood that quantities of processors and memories in the map using apparatus 42 are not limited in this application. It should be noted that the map using apparatus may be a vehicle, or may be a component (for example, a navigation apparatus or an autonomous driving apparatus in a vehicle) that can be used in a vehicle, or may be a chip that can be used in a vehicle. The map using apparatus may be a portable terminal, for example, a mobile phone, a portable computer, or a navigator, or may be a component that can be used in a portable terminal, or may be a chip that can be used in a portable terminal.

The bus 424 may be a peripheral component interconnect (PCI) bus, an extended industry standard architecture (EISA) bus, and the like. Buses may be classified into an address bus, a data bus, a control bus, and the like. For ease of representation, only one line is used in FIG. 15 for representation, but it does not indicate that there is only one bus or only one type of bus. The bus 424 may include a channel for transferring information between various components (for example, the memory 423, the processor 421, and the communication interface 422) of the map using apparatus 42.

The processor 421 may include any one or more of a central processing unit (CPU), a microprocessor (MP), or a digital signal processor (DSP).

The memory 423 is configured to provide storage space, and the storage space may store data such as an operating system and a computer program. The memory 423 may be one or a combination of a random access memory (RAM), an erasable programmable read-only memory (EPROM), a read-only memory (ROM), or a portable read-only memory (CD-ROM). The memory 423 may exist independently, or may be integrated into the processor 421.

The communication interface 422 may be configured to provide an information input or output for the processor 421. Alternatively, the communication interface 422 may be configured to receive data sent from the outside and/or send data to the outside, and may be a wired link interface including an Ethernet cable or the like, or may be a wireless link (for example, Wi-Fi, Bluetooth, universal wireless transmission, or an in-vehicle short-range communication technology) interface. Alternatively, the communication interface 422 may further include a transmitter (for example, a radio frequency transmitter or an antenna), a receiver, or the like coupled to the interface.

The processor 421 in the map using apparatus 42 is configured to read a computer program stored in the memory 423, and is configured to perform the method described in FIG. 7 or FIG. 11.

In a possible design, the map using apparatus 42 may be one or more modules in the apparatus that performs the method shown in FIG. 7 or FIG. 11. The processor 421 may be configured to read one or more computer programs stored in the memory, and is configured to perform the following operations:

- obtaining first information by using the obtaining unit 410, where the first information indicates that there is an association relationship between at least two events, the at least two events include a first event and a second event, the first information includes association type information, the association type information indicates a type of the association relationship, and the at least two events are events in a map; and performing a sensed information fusion operation, an event prediction operation, or a map tile update operation based on the first information.

An embodiment of this application further provides a map data processing apparatus. The map data processing apparatus includes an obtaining unit and a storage unit. The obtaining unit is configured to obtain first information. The first information indicates that there is an association relationship between at least two events, the at least two events include a first event and a second event, the first information includes association type information, the association type information indicates a type of the association relationship, and the at least two events are events in a map. The storage unit is configured to store the first information as data of the map. The obtaining first information may be generating the first information or receiving the first information. In some possible embodiments, the map data processing apparatus further includes a processing unit, configured to perform a sensed information fusion operation, an event prediction operation, or a map tile update operation based on the first information.

The map data processing apparatus may be the map generation apparatus shown in FIG. 12. The map data processing apparatus may alternatively be the map using apparatus shown in FIG. 13. The map data processing apparatus may alternatively be an apparatus that integrates the map generation apparatus shown in FIG. 12 and the map using apparatus shown in FIG. 13. This is not specifically limited in this embodiment of this application. The map data processing apparatus may be configured to perform the method described in any one of the foregoing embodiments in FIG. 8, FIG. 10, FIG. 7, and FIG. 11.

An embodiment of this application further provides a map data processing apparatus. The map data processing apparatus may be the map generation apparatus shown in FIG. 14. The map data processing apparatus may alternatively be the map using apparatus shown in FIG. 15. The map data processing apparatus may alternatively be an apparatus that integrates the map generation apparatus shown in FIG. 14 and the map using apparatus shown in FIG. 15. This is not specifically limited in this embodiment of this application. The map data processing apparatus may be configured to perform the method described in any one of the foregoing embodiments in FIG. 8, FIG. 10, FIG. 7, and FIG. 11.

An embodiment of this application further provides a map data processing system. The map data processing system includes a first map data processing apparatus and a second map data processing apparatus. The first map data processing apparatus may be, for example, the map generation apparatus shown in FIG. 14, and the second map data processing apparatus may be, for example, the map using apparatus shown in FIG. 15. The first map data processing apparatus may be configured to perform the methods described in embodiments in FIG. 8, FIG. 10, and FIG. 7, and the second map data processing apparatus may be configured to perform the method described in the embodiment in FIG. 11.

In the foregoing embodiments in this specification, the description of each embodiment has respective focuses. For a part that is not described in detail in an embodiment, refer to related descriptions in other embodiments.

It should be noted that a person of ordinary skill in the art may see that, all or a part of the steps in each method of the foregoing embodiments may be implemented by a program instructing related hardware. The program may be stored in a computer-readable storage medium. The storage medium includes a read-only memory (ROM), a random access memory (RAM), a programmable read-only memory (PROM), an erasable programmable read-only memory (EPROM), a one-time programmable read-only memory (OTPROM), an electrically-erasable programmable read-only memory, (EEPROM), a compact disc read-only memory (CD-ROM) or another optical disk memory, a magnetic disk memory, a magnetic tape memory, or any other computer-readable medium that can be configured to carry or store data.

The technical solutions of this application essentially, or the part contributing to the conventional technology, or all or some of the technical solutions may be implemented in a form of a software product. A computer program product is stored in a storage medium and includes several instructions for instructing a device (which may be a personal computer, a server, a network device, a robot, a single-chip microcomputer, a chip, a robot, or the like) to perform all or some of the steps of the methods described in embodiments of this application.

What is claimed is:

1. A map data processing apparatus in a vehicle, the map data processing apparatus comprising:

a memory storing executable instructions; and a processor configured to execute the executable instructions to:

obtain first information indicating that there is an association relationship between a first event and a second event, wherein the first information comprises association type information indicating a type of the association relationship, and the first and second events are events in a map, and wherein the type of the association relationship comprises that the first event is a cause event of the second event, or the first event is a result event of the second event;

store the first information as data of the map;

predict a status of the second event at a preset future moment based on the first information, a current status of the first event, and a current status of the second event;

update the status of the second event, using a predicted status; and control the vehicle for autonomous driving based on an updated status of the second event, wherein each of the first and second events is stored with basic event information, the basic event information comprises description information for a corresponding event, wherein the processor is further configured to:

obtain second information indicating a current status of the first event;

determine, based on the second information, whether the first event changes;

determine, based on the first information, whether the first event meets a preset condition; and when the first event changes and the first event meets the preset condition, update the description information of the second event in the map based on the second information.

2. The apparatus according to claim 1, wherein the processor is configured to obtain the first information by:

generating the first information or receiving the first information.

3. The apparatus according to claim 1, wherein the first information further comprises an association factor indicating a degree of correlation between the first event and the second event.

4. The apparatus according to claim 1, wherein the first information further comprises:

information indicating an identifier of the first event;

information indicating an identifier of the second event;

information indicating an identifier of a map tile in which the first event is located; or information indicating an identifier of a map tile in which the second event is located.

5. The apparatus according to claim 1, wherein the preset condition comprises:

the first event is the cause event of the second event; or there is an association relationship between the first event and the second event, and a degree of correlation between the first event and the second event is greater than a first threshold, wherein the processor is further configured to:

determine that the first event disappears;

determine that the first event is a new event; or determine that a degree of change of the first event is greater than a second threshold.

6. The apparatus according to claim 1, wherein the processor is further configured to:

update the first information when:

a quantity of changed events in a plurality of events comprising the first and second events exceeds a third threshold;

a quantity of disappeared events in a plurality of events comprising the first and second events exceeds a fourth threshold;

a degree of change of the first event exceeds a fifth threshold; or a quantity of new first events or new second events exceeds a sixth threshold.

7. The apparatus according to claim 1, wherein the processor is further configured to:

determine, based on the first information, a trustworthiness degree of information sensed by a sensing device.

8. The apparatus according to claim 1, wherein the processor is further configured to:

when it is detected that the first event changes, determine, based on the first information, that the second event changes;

determine a target tile to which the second event belongs in the map; and update the target tile.

9. The apparatus according to claim 1, wherein the first information further comprises a time correlation factor indicating a degree of time correlation between the first event and the second event.

10. The apparatus according to claim 1, wherein the first information further comprises:

information indicating overlapping duration between a first time range of the first event and a second time range of the second event;

information indicating a first intersection over union between the first time range and the second time range; or information indicating a time interval between the first time range and the second time range, wherein the first intersection over union is a ratio of the overlapping duration to duration of a third time range, and the third time range is a union set of the first time range and the second time range.

11. The apparatus according to claim 1, wherein the first information further comprises:

a spatial correlation factor indicating a degree of spatial correlation between the first event and the second event.

12. The apparatus according to claim 1, wherein the first information further comprises:

information indicating an overlapping area between first location data of the first event and second location data of the second event;

information indicating a second intersection over union between the first location data and the second location data;

information indicating an interval distance between the first location data and the second location data; or information indicating a degree of traffic reachability between the first location data and the second location data, wherein the second intersection over union is a ratio of the overlapping area to an area of third location data, and the third location data is a union set of the first location data and the second location data.

13. The apparatus according to claim 1, wherein the first information further comprises a spatiotemporal correlation factor indicating a degree of time and space correlation between the first event and the second event.

14. The apparatus according to claim 1, wherein the first information further comprises an attribute correlation factor indicating a degree of attribute correlation between the first event and the second event.

15. The apparatus according to claim 1, wherein the first information is stored in a data structure, wherein the data structure is in the map and is used to describe the first event or the second event.

16. The apparatus according to claim 1, wherein the first information is stored in a data structure, wherein the data structure uses an identifier of the first event and an identifier of the second event as a joint index.

17. A map data processing method performed by a map data processing device in a vehicle, the map data processing method comprising:

obtaining first information indicating that there is an association relationship between a first event and a second event, wherein the first information comprises association type information, indicating a type of the association relationship, and the first and second events are events in a map, and wherein the type of the association relationship comprises that the first event is a cause event of the second event, or the first event is a result event of the second event;

storing the first information as data of the map;

predicting a status of the second event at a preset future moment based on the first information, a current status of the first event, and a current status of the second event;

updating the status of the second event, using a predicted status; and controlling the vehicle for autonomous driving based on an updated status of the second event, wherein each of the first and second events is stored with basic event information, the basic event information comprises description information for the corresponding event, wherein the method further comprises:

obtaining second information indicating a current status of the first event;

determining, based on the second information, whether the first event changes;

determining, based on the first information, whether the first event meets a preset condition; and when the first event changes and the first event meets the preset condition, updating the description information of the second event in the map based on the second information.

18. The map data processing method according to claim 17, wherein obtain the first information comprises:

generating the first information or receiving the first information.

19. The map data processing method according to claim 17, wherein the first information further comprises an association factor indicating a degree of correlation between the first event and the second event.

* * * * *